(12) United States Patent
Coakley et al.

(10) Patent No.: US 10,899,417 B1
(45) Date of Patent: Jan. 26, 2021

(54) HYDRODYNAMIC FLOW SEPARATION DEVICE FOR AN AXISYMMETRIC BLUFF BODY

(71) Applicant: The United States of America, as represented by the Secretary of the Navy, Arlington, VA (US)

(72) Inventors: David B. Coakley, Alexandria, VA (US); Stephen M. Shepherd, Washington, DC (US); David A. Newborn, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/439,108

(22) Filed: Jun. 12, 2019

(51) Int. Cl.
  *B63B 1/32* (2006.01)
  *B63B 1/36* (2006.01)
  *F03B 17/06* (2006.01)
  *B63B 1/34* (2006.01)

(52) U.S. Cl.
  CPC ............... *B63B 1/322* (2013.01); *B63B 1/34* (2013.01); *B63B 1/36* (2013.01); *F03B 17/061* (2013.01); *F05B 2240/97* (2013.01)

(58) Field of Classification Search
  CPC .. B63B 1/322; B63B 1/34; B63B 1/36; B63B 35/44; B63H 11/00; B63H 11/02; B63H 11/04; F03B 17/061
  USPC ...................................... 114/67 A, 67 R, 274
  See application file for complete search history.

(56) References Cited

U.S. PATENT DOCUMENTS

| 2,969,759 | A | * | 1/1961 | Giles | B63B 1/34 |
| | | | | | 114/67 A |
| 3,205,846 | A | * | 9/1965 | Lang | B63B 1/38 |
| | | | | | 114/67 A |
| 3,779,199 | A | * | 12/1973 | Mayer, Jr. | B63B 1/36 |
| | | | | | 114/337 |
| 5,158,251 | A | | 10/1992 | Taylor | |
| 6,148,751 | A | | 11/2000 | Brown et al. | |
| 6,349,664 | B1 | | 2/2002 | Brown et al. | |

(Continued)

OTHER PUBLICATIONS

J.B. Freund and M.G. Mungal, "Drag and Wake Modification of Axisymmetric Bluff Bodies Using Coanda Blowing," Journal of Aircraft, vol. 31, No. 3, pp. 572-578, May-Jun. 1994.

*Primary Examiner* — Lars A Olson
(74) *Attorney, Agent, or Firm* — Howard Kaiser

(57) ABSTRACT

In the absence of inventive practice, the hydrodynamic flows on both sides of a vertically oriented bluff body (e.g., cylinder) traveling through water tend to hug the bluff body proximate its curved back surface and to converge behind the bluff body, resulting in lateral sway of the bluff body. Exemplary inventive practice provides for attachment of a pair of waterjet-streaming devices at opposite axial ends of a bluff body such as a cylinder. The waterjet streams discharged by the two inventive devices, which adjoin the vertical bluff body, deflect the hydrodynamic flows on both curved side surfaces of the bluff body. The inventive apparatus thereby encourages a continued approximate parallelity of the hydrodynamic flows behind the bluff body, resulting in significantly greater stability of the bluff body. Some exemplary embodiments of the present invention provide for attachment of a single waterjet-streaming device at one axial end of the bluff body.

23 Claims, 19 Drawing Sheets

(56) References Cited

U.S. PATENT DOCUMENTS

| | | | |
|---|---|---|---|
| 6,701,862 B2 * | 3/2004 | Hilleman | B63G 8/08 |
| | | | 114/338 |
| 6,725,797 B2 * | 4/2004 | Hilleman | B63H 11/08 |
| | | | 114/337 |
| 7,108,457 B1 | 9/2006 | Brown et al. | |
| 7,226,325 B1 * | 6/2007 | Kirschner | B63B 1/38 |
| | | | 114/67 A |
| 10,286,983 B1 | 5/2019 | Coakley | |

* cited by examiner

1000

(a)

(b)

HYDRODYNAMIC FLOW SEPARATION DEVICE FOR AN AXISYMMETRIC BLUFF BODY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to the hydrodynamics of bluff bodies, more particularly to methods and apparatuses for changing or influencing the hydrodynamics associated with situation of a bluff body at or near the aft end of a marine vessel.

In the parlance of the fluid dynamic arts, a distinction may be drawn between a "bluff body" and a "streamlined body" in describing the shape of a body and the drag forces experienced by the body when moving through a fluid. Generally speaking, regardless of whether a body is bluff or streamlined, the body will encounter both frictional drag (also known as viscous drag) and pressure drag. Typically, a bluff body will predominately experience pressure drag, whereas a streamlined body will predominately experience friction drag.

The performance of a vehicle moving through water or air may be largely determined by the drag forces exerted upon the vehicle. For instance, the hydrodynamics of a marine vessel may be significantly altered by the coupling of adjunctive structure with the vessel. A case in point is a vertical cylindrical adjunct attached at the rear of a marine vessel for purposes of housing sensors or other instrumentation. The adjunct in this case is a bluff body by virtue of its cylindrical shape. It may be desirable to mitigate the deleterious hydrodynamic consequences of such structural placement.

SUMMARY OF THE INVENTION

In view of the foregoing, an object of the present invention is to provide method and apparatus for attenuating the hydrodynamic effects of a bluff body that is integrated with or attached to a marine body at or near the rear of the marine body, such as an adjunctive bluff body placed aft of a marine vessel.

The present invention represents a novel hydraulic methodology for beneficially affecting hydrodynamics involving bluff bodies in association with marine vessels. As exemplarily embodied, the present invention provides a hydrodynamic stabilization apparatus for mitigating lateral swing instability (e.g., sway or oscillation) such as may be associated with a vertical axisymmetric bluff body situated at or closely behind the stern of a marine vessel. Exemplary inventive practice uniquely features, inter alia, its implementation of transverse jets so as to cause separation around truncated cylinders and other bluff bodies. An exemplary inventive embodiment represents a unique hydraulic methodology for causing separation around bluff bodies using transverse jets. The term "marine vessel," as used herein, broadly refers to any manmade object, self-propelled or externally propelled, that is designed to travel through water, including but not limited to ships, boats, submersibles, and bodies towed by cables.

In accordance with exemplary practice of the present invention, an inventive apparatus is capable of effecting continually self-stabilizing movement in a fluidic (e.g., air or water) environment. The inventive apparatus includes an approximately cylindrical structure and an inventive device that includes a fluid jet component. The approximately cylindrical structure is characterized by a geometric longitudinal axis, an axial surface, and two axial end surfaces. The axial surface includes two lateral surface areas (regions) on opposite sides of the geometric longitudinal axis. The inventive device is coupled with the cylindrical structure at an axial end. According to exemplary inventive practice, the inventive device and the bluff body are coupled so as to have contiguous respective surfaces, such as exemplified by an adjoining of the two respective substantially flat surfaces of an inventive device (along its top side or bottom side) and a cylindrical bluff body (at its axial end).

According to exemplary inventive practice, the following occurrences are associated with forward movement of the inventive apparatus through a fluidic medium whereby the geometric longitudinal axis is approximately vertical: Dynamic flow of the ambient fluid includes two separate dynamic fluid flows that are respectively generally tangential to the two lateral surface areas and that are each directed generally opposite the forward movement of the approximately cylindrical structure. The fluid jet component intakes ambient fluid and outputs two jet fluid streams respectively flowing adjacent the two lateral surface areas of said axial surface. The two jet fluid streams respectively affect the two dynamic fluid flows so as to at least substantially prevent convergence of the two dynamic fluid flows behind said approximately cylindrical structure. Accordingly, the inventive device at least substantially maintains stability of the approximately cylindrical structure.

BRIEF DESCRIPTION OF THE DRAWINGS

The present invention will now be described, by way of example, with reference to the accompanying drawings, wherein like numbers indicate same or similar parts or components, and wherein:

FIGS. 5, 6, 12, and 16 are perspective views wherein the top inventive flow-separation device is shown above the cylindrical adjunct. FIGS. 7 and 8 are inverted perspective views wherein the bottom inventive flow-separation device is shown above the cylindrical adjunct. FIGS. 9, 10, 13, 14, and 17 are elevation views. FIGS. 11 and 15 are plan views. FIG. 6 is a transparent version of FIG. 5. FIG. 16 is a transparent version of FIG.

12. FIG. 8 is a transparent version of FIG. 7. FIG. 15 is a transparent version of FIG. 11.

FIG. 21 shows two cylindrical bluff bodies and at least three inventive flow-separation devices. FIG. 22 shows three cylindrical bluff bodies and at least four inventive flow-separation devices.

DESCRIPTION OF EXEMPLARY EMBODIMENTS OF THE INVENTION

Figure 1:
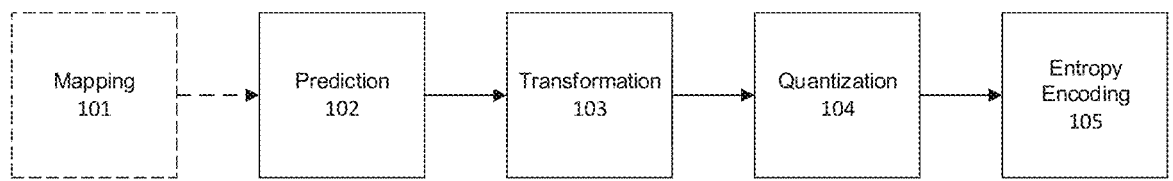
FIG. 1 is a diagram illustrating an example of a notionally representative marine vessel and a vertical cylindrical bluff-body adjunct fixedly attached astern of the marine vessel.

Referring now to FIGS. 1 through 4, a notional marine vessel 1000 includes a main hull 1001 and four foils 1002. Attached to hull 1001 via coupling 450 is a vertical axisymmetric adjunctive bluff body 100. Vessel 1000 is traveling in heading direction D. Cylindrical adjunctive bluff body 100 is characterized by a vertical axis of symmetry a, a diameter d, a height h, a geometric bisector plane p, an axial cylindrical surface 101 and, at the axial ends, two circular end surfaces 102. According to usual inventive practice, the bluff body is characterized by a verticality of an axis of symmetry, and by a curvature or roundedness at its aft end such as rounded aft cylindrical surface portion 105 shown in FIG. 3. Hydrodynamic flow direction H is generally opposite heading direction D, and is generally tangential along portions of said cylindrical surface 101 at generally opposite sides of cylindrical bluff body 100.

Figure 2:
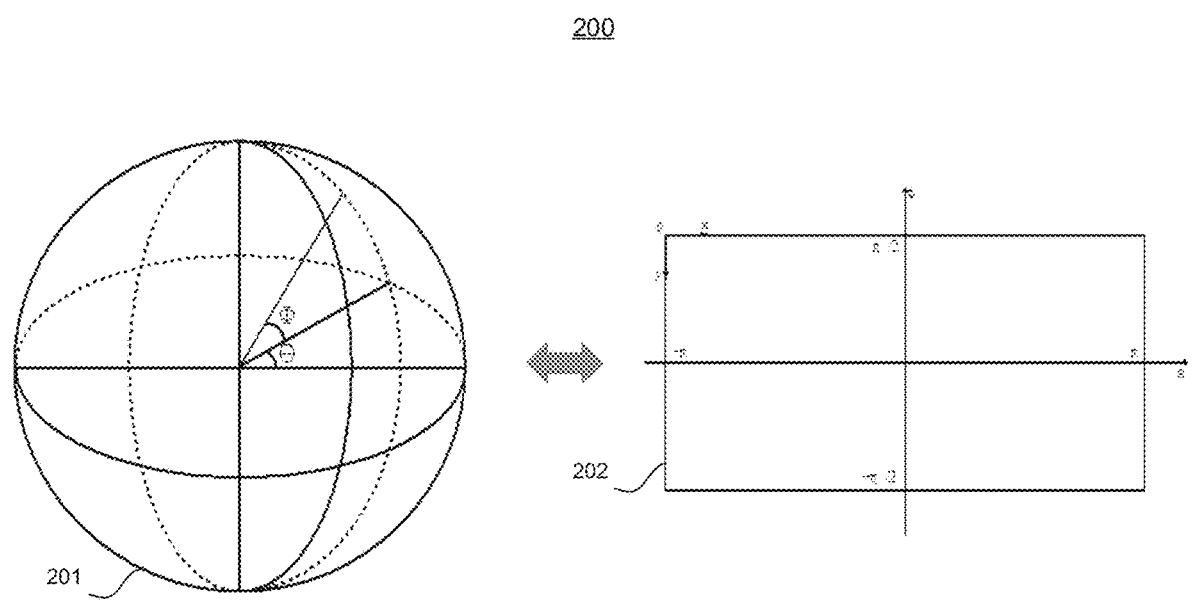
FIGS. 2 and 3 are diagrams illustrating an example of hydrodynamic side-to-side swaying of the cylindrical adjunct shown in FIG. 1.
Figure 3:
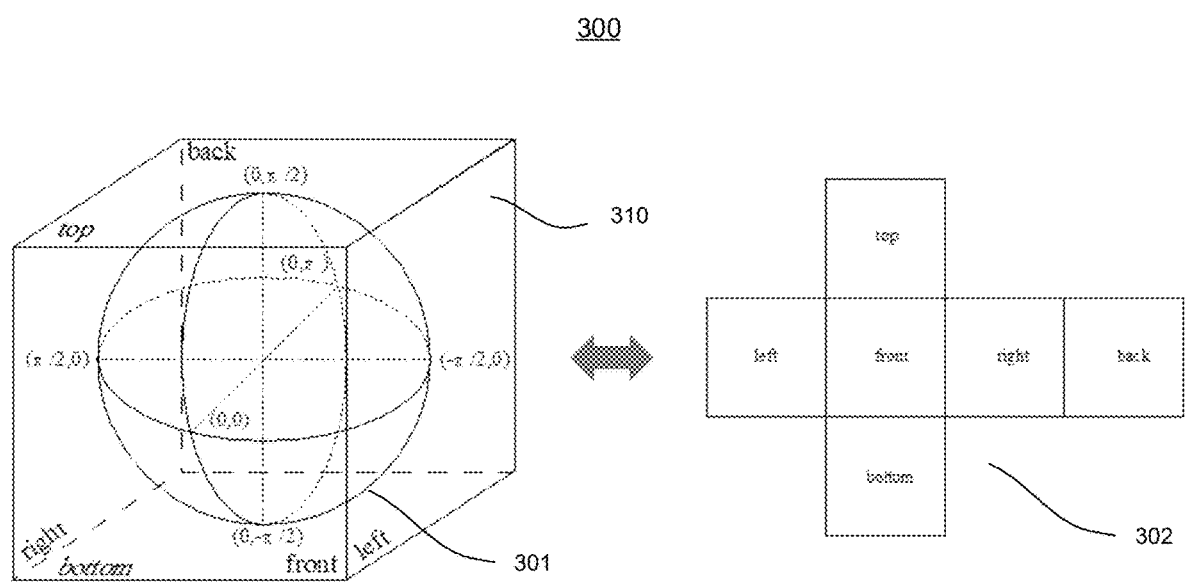

As shown in FIGS. 2 and 3, large alternating forces F in athwartship directions tend to be associated with cylinder 100 when moving through water. The two tangential hydrodynamic flows H each tend to hug axial cylindrical surface 101 in its back region, and accordingly tend to converge aft of cylindrical surface 101. Hydrodynamic flow H around cylinder 100 is accordingly asymmetric, particularly laterally, switching back and forth in directional tendencies between port-side and starboard-side. Cylindrical adjunct 100, and hence vehicle 1000 in combination therewith, may be significantly unstable in accordance with this fluidic oscillation or fluctuation. The instability may even be sufficiently severe to cause failure of the vehicle in its intended role or mission.

Figure 4:
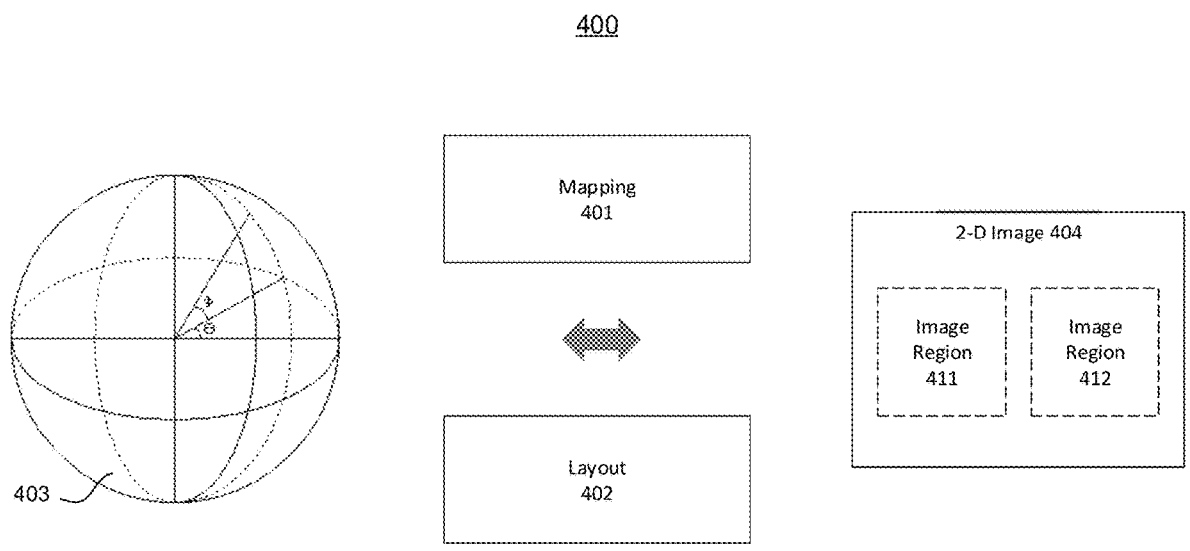
FIG. 4 is a diagram illustrating an example of inventive practice with respect to the marine vessel and cylindrical adjunct shown in FIG. 1, wherein an inventive flow-separation apparatus is combined with the cylindrical adjunct, resulting in alleviation or elimination of the hydrodynamic side-to-side swaying shown in FIGS. 2 and 3.

As shown in FIG. 4, inventive practice implements peripheral waterjets J so as to interact with the tangential hydrodynamic flows H on both sides of adjunctive cylinder 100. Waterjets J, generally perpendicularly impacting the tangential hydrodynamic flows H, cause separation s of each of the two tangential hydrodynamic flows H from its corresponding back region of axial cylindrical surface 101, accordingly resulting in greater separation from each other. Hydrodynamic flow around cylinder 100 improves considerably as a result of these inventively induced flow separations s on both sides of cylinder 100. In particular, inventive practice reduces or eliminates the laterally asymmetric nature of the unsteady flow. Deriving from original hydrodynamic flow H are two waterjet-altered hydrodynamic currents HJ, which are generally parallel to original hydrodynamic flow H and to each other. Flow bubble BB, formed between the two currents HJ, facilitates and maintains the separation s therebetween. Accordingly, while inventive practice may potentially increase drag, a superseding benefit of inventive practice is prevention, to at least a significant degree, of hydrodynamic flow H from causing net forces to the left and right, thereby stabilizing cylindrical adjunct 100 and hence vehicle 1000.

Conventional practice typically involves resort to auxiliary structure in order to mitigate deleterious hydrodynamic effects of a bluff body 100. For instance, in many applications, conventional utilization of such auxiliary structure may degrade sensory performance. Advantageously, inventive practice allows for complete and unadulterated retention of the cylindrical geometry of a bluff body cylinder 100.

Still with reference to FIG. 4 and also with reference to FIGS. 5 through 17, an exemplary embodiment of the present invention's flow separation system 2000 includes two inventive flow separation devices 200, viz., top (upper) flow separation device 200T and bottom (lower) flow separation device 200B. Peripheral waterjet streams J are emitted by inventive flow separation devices 200 generally toward bisector plane p of adjunctive cylinder 100, generally perpendicular to hydrodynamic flow direction H, and generally parallel to axis a of adjunctive cylinder 100.

Flow separation devices 200T and 200B are the main components of flow separation system 2000. Inventive device 200T produces a generally downward jet J; inventive device 200B produces a generally upward jet J. Each flow separation device 200 includes two water jet conduits 210 and is characterized on opposite back sides by two "streamline" tapers 222. Although a back-tapered configuration characterizing inventive device 200 is shown herein by way of example, depending on the inventive embodiment an inventive device 200 may or may not have a tapering character. Particularly as shown in FIGS. 5 through 8, each conduit 210 includes an inlet 211 (for intake of hydrodynamic flow H) and an outlet 212 (for output of waterjet streaming J). Each jet stream outlet 212 includes three adjacent nozzles 213 for pressurized release of waterjets J. Each of the two inlets 211 faces the oncoming hydrodynamic flow H. Each of the two conduits 210 represents a water jet (synonymously, pump-jet or hydrojet) mechanism for converting high static pressure at the front of inventive device 200 into high velocity jets streaming approximately normal to hydrodynamic flow H around bluff body 100. Although each outlet 212 is shown herein by way of example to include three nozzles 213, inventive practice admits of utilization of practically any number of nozzles. According to some inventive embodiments, each (or at least one) inlet is provided with a screen, placed on or over the inlet, to prevent entities such as fish or other marine life from entering the inlet. In the light of the instant disclosure, the ordinarily skilled artisan will appreciate how to utilize one or more water jet mechanisms (e.g., including an axial flow pump and/or a centrifugal flow pump) to efficaciously produce water jet streaming in accordance with the present invention.

In the example shown in FIGS. 5 through 8, inventive devices 200T and 200B are functionally similar but are structurally or configuratively different. For instance, the conduits 210 of upper inventive device 100T significantly differ in shape vis-à-vis the conduits 210 of lower inventive device 1006. Inventive device 200T and inventive device 200B both generally define a horizontal geometric plane and are characterized by symmetry about a longitudinal axis b. However, inventive device 200T has a substantially flat outward surface, whereas inventive device 200B has a central outward bulge. In the light of the instant disclosure, the ordinarily skilled artisan will be capable of designing an inventive device 200, or a similar or dissimilar pair of inventive devices 200, that is/are suitable for a contemplated application.

Figure 5:
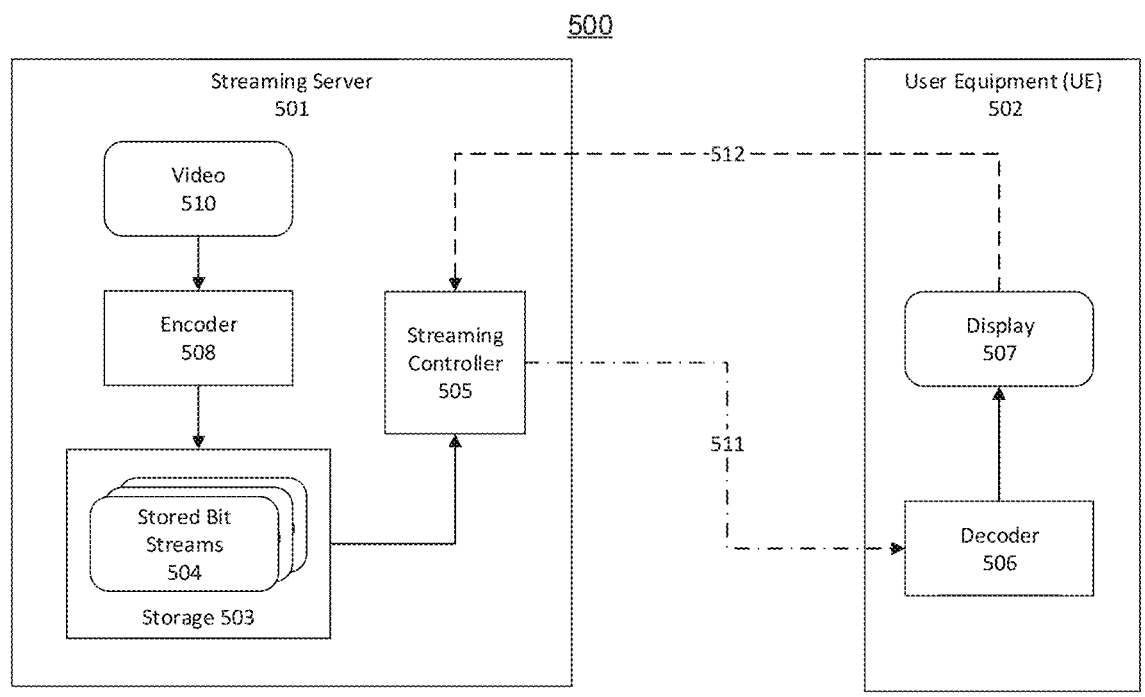
FIGS. 5 through 17 are diagrams illustrating an inventive combination, such as depicted in FIG. 4, of an embodiment of an inventive flow-separation unit with a cylindrical bluff body. The inventive flow-separation unit includes a top inventive flow-separation device and a bottom inventive flow-separation device.
Figure 6:
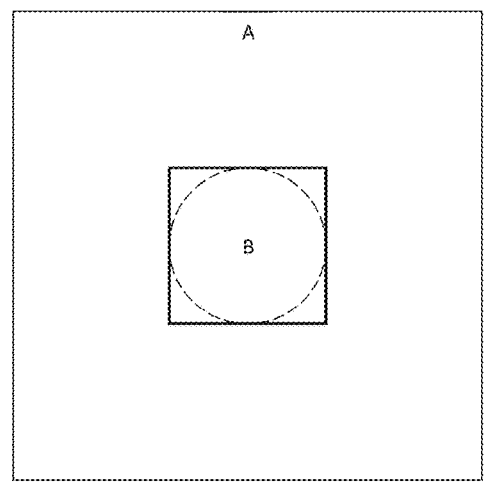
Figure 7:
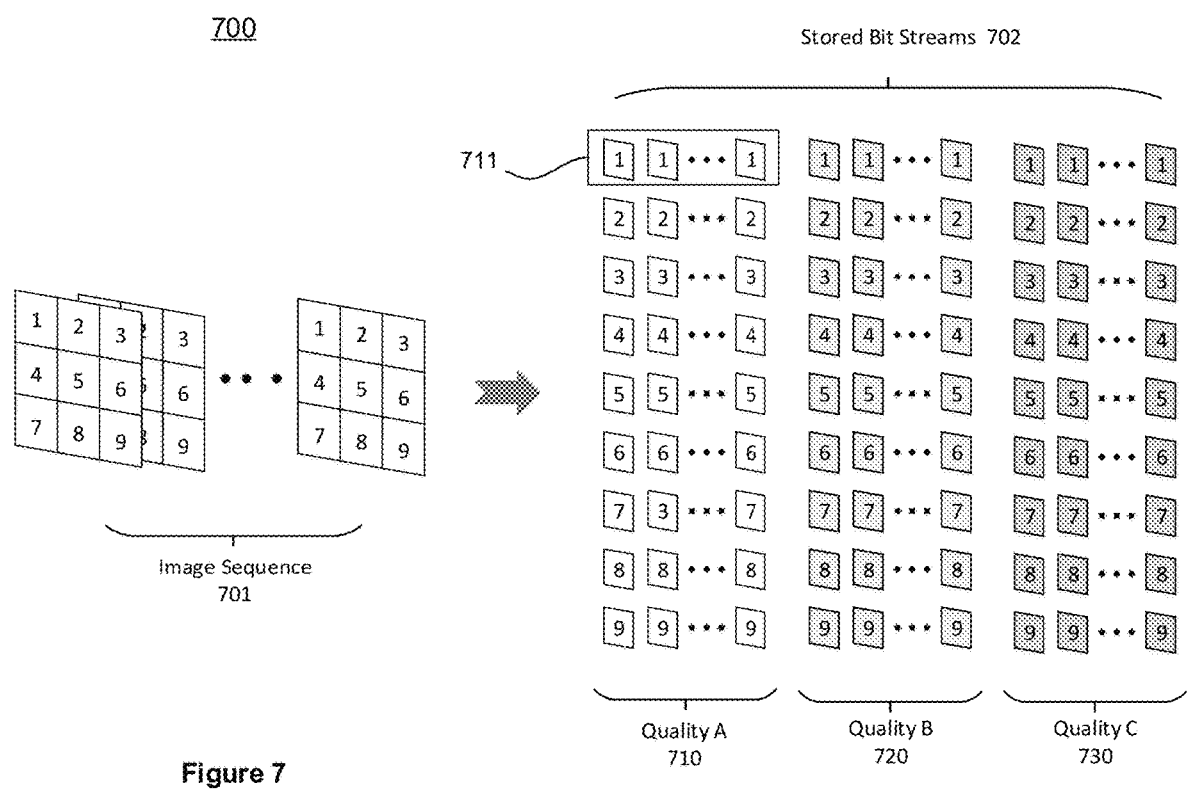
Figure 8:
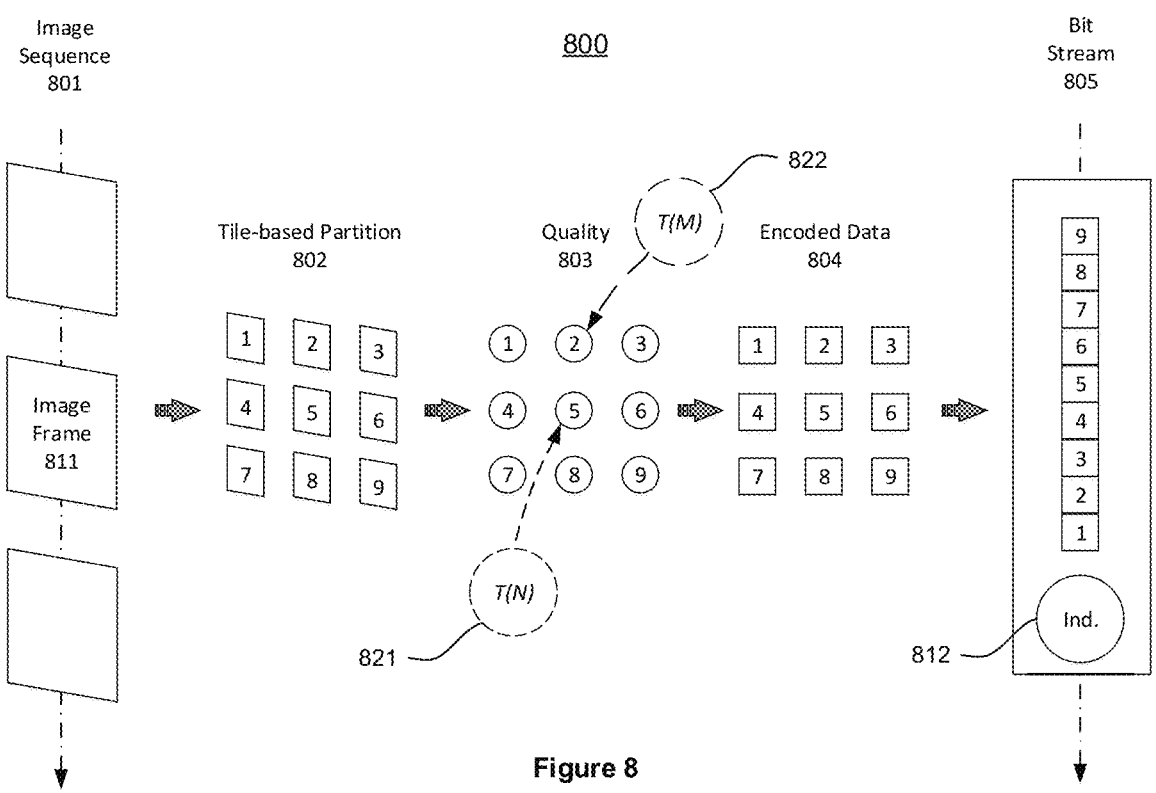
Figure 9:
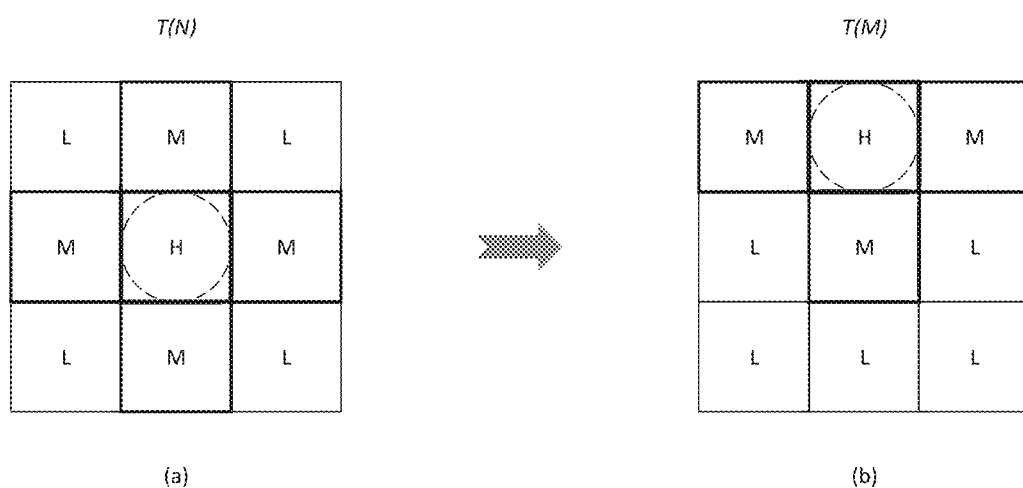

As shown in FIGS. 5 and 6, upper inventive device 200T has two conduits 210, viz., port-side conduit 210P and starboard-side conduit 210S. Port conduit 210P of upper inventive device 200T includes port flow inlet 211P and port jet outlet 212. Starboard conduit 210S of upper inventive device 200T includes starboard flow inlet 211S and starboard jet outlet 212S. Similarly, as shown in FIGS. 7 and 8, lower inventive device 200B has two conduits 210, viz., port-side conduit 210P and starboard-side conduit 210S. port conduit 210 of lower inventive device 200B includes port inlet 211P, and starboard conduit 210 of lower inventive device 200B includes starboard flow inlet 211S.

Some exemplary inventive embodiments feature a combination of two congruous flow separation devices 200 working in tandem, such as upper flow separation device 200T and lower flow separation device 200B shown in FIGS. 5 through 8 and other figures herein. Inventive devices 200T and 200B together constitute the primary elements of an inventive flow separation unit 2000. It may be considered that an inventive unit 2000, in combination with a vertical axisymmetric bluff body 100, constitutes the primary elements of an inventive flow-separating adjunctive system 3000, which for instance is an integral adjunctive apparatus that is both functionally and hydrodynamically propitious.

Depending on the inventive embodiment, inventive system 3000 need not be "adjunctive." That is, inventive practice is not limited to applications wherein inventive apparatus is added to a previously existing bluff-body structure. Rather, inventive practice is possible wherein an inventive system 3000 is originally made an integral part of an entire seafaring entity. Furthermore, depending on the inventive embodiment, an inventive unit 2000 may be used in combination with a bluff-body structure 100 that itself is either an adjunct to another object or an integral aft portion of a larger whole.

Figure 11:
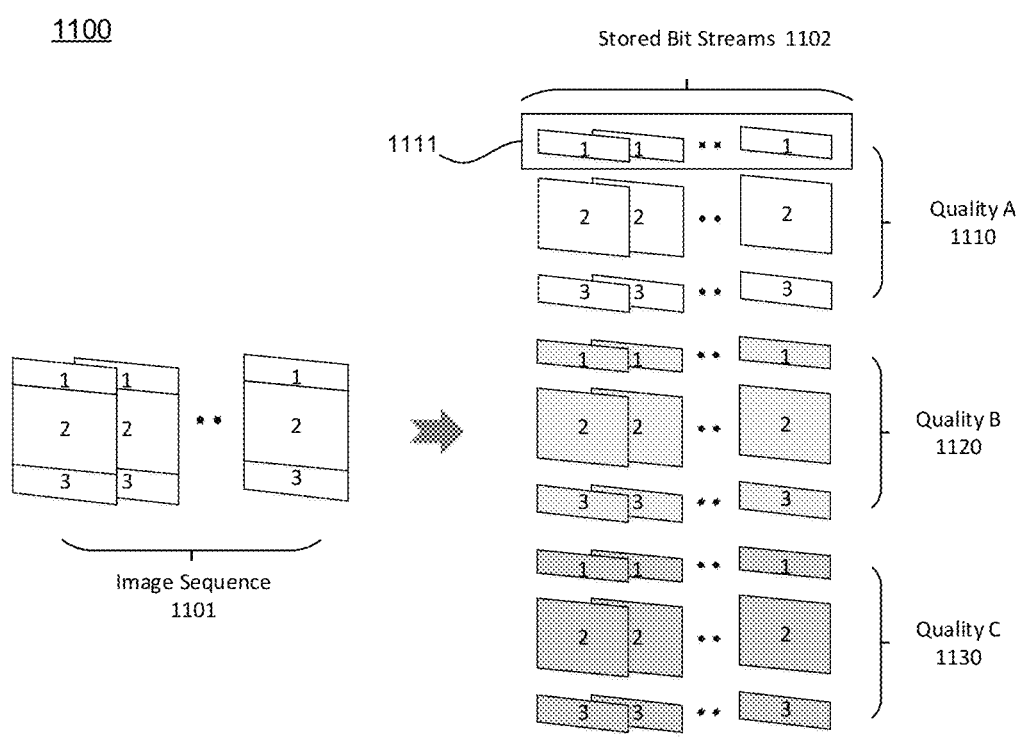
Figure 12:
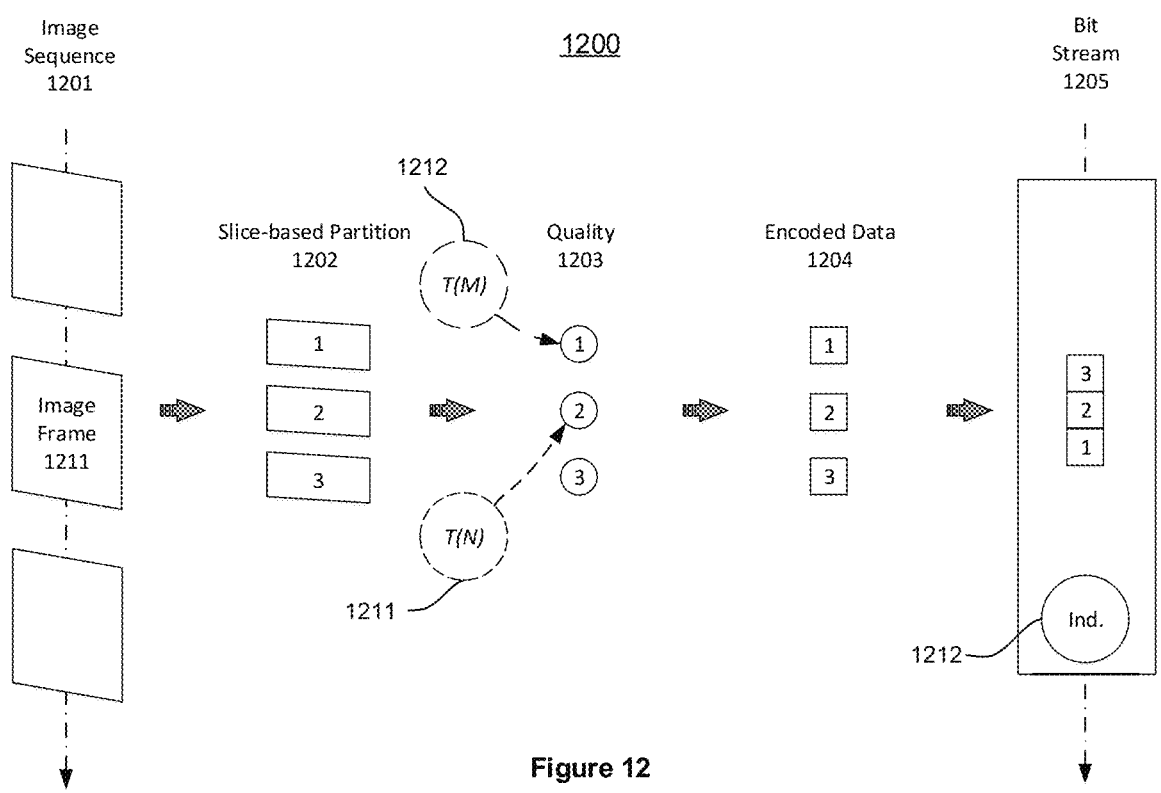

As illustrated in FIG. 11 and other figures, the periphery (perimeter) of each inventive flow separation device 200 is characterized by two curvilinear lateral edges 220, a linear front edge 230, and a linear back edge 240. Each inventive device 200 is characterized, in a horizontal geometric plane generally defined by inventive device 200, by symmetry about the longitudinal axis b of inventive device 200. The curvilinear lateral edges 220 are mirror-image shapes symmetrically disposed on opposite sides of axis b. Located at the front and back ends respectively of inventive device 200 are linear front edge 230 and linear back edge 240, which are each perpendicular to axis b and are parallel to each other. It is to be understood that, according to exemplary inventive practice, either front edge 230 or back edge 240, or both front edge 230 and back edge 240, may be curvilinear instead of linear. Many inventive embodiments in which front edge 230 and/or back edge 240 is/are curvilinear are characterized by parallelism of front edge 230 and back edge 240 with respect to each other, and/or by perpendicularity of front edge 230 and/or back edge 240 with respect to axis b. Depending on the inventive embodiment, the curvature of either front edge 230 or back edge 240 may be characterized by either concavity or convexity with respect to the oncoming hydrodynamic flow H.

Each curvilinear lateral edge 220 includes a curved edge portion 221 and a linear edge portion 222. In furtherance of the hydrodynamics of vessel 100 and inventive system 3000, each curvilinear lateral edge 220 is contoured toward the back. That is, curvilinear later edge 220 includes a substantially linear streamline-tapering edge portion 222, which meets linear back edge 240 at the back end of inventive device 100. The tapers may serve, for instance, to reduce drag; however, depending on the inventive embodiment, the present invention may be practiced in the absence of such tapers. Accordingly, inventive devices 200T and 200B are each divided into two adjoining sections, viz., front section 221 and back section 222. Front device section 221 includes linear front edge 230 and two curved edge portions 221. Back device section 222 includes linear back edge 240 and the two substantially linear streamline-tapering edge portions 222. As illustrated in FIG. 4, the inwardly flared straight-edged shape of back section 222 encourages sustained separation of the two opposite waterjet-altered hydrodynamic currents HJ from each other.

Figure 10:
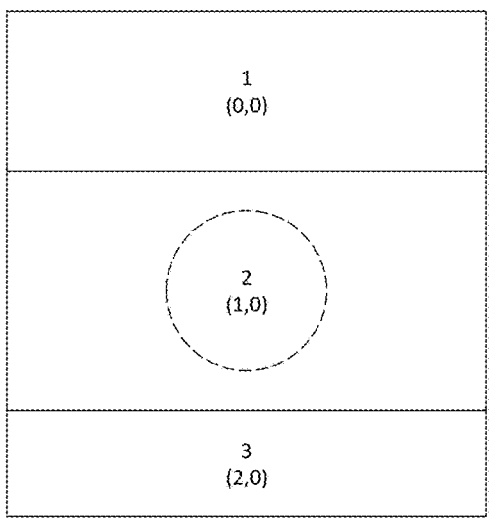
Figure 10:
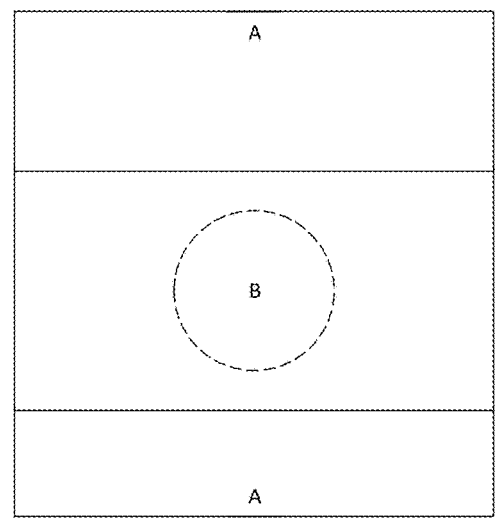
Figure 14:
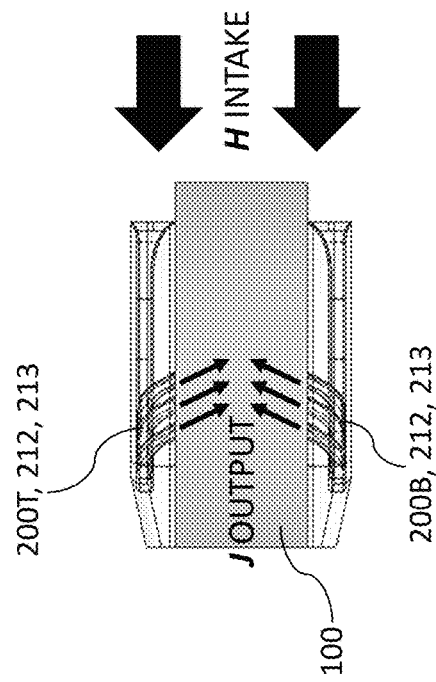
Figure 17:
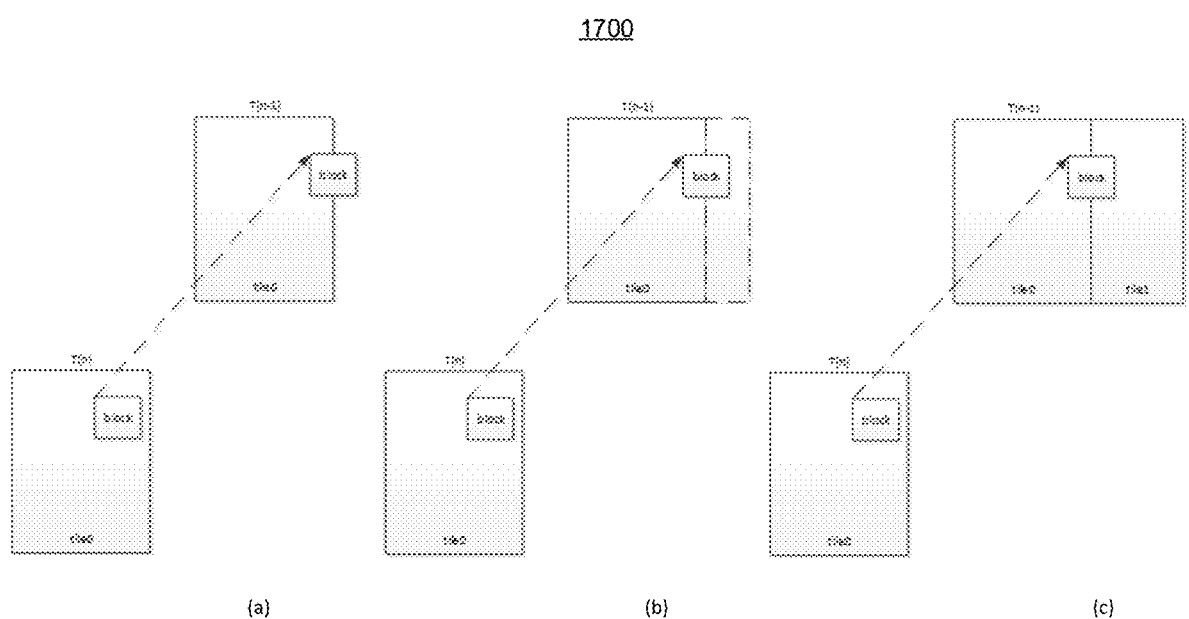

With reference to FIGS. 10, 14, and 17, depending on the inventive embodiment, nozzles 213 and hence waterjets J may be disposed in approximate verticality or at various longitudinal and transverse angles of inclination. According to examples shown herein, waterjets J, emitted from nozzles 213 of outlets 212, are angled toward the side walls of cylindrical body 100 and in forward direction D. FIGS. 10 and 14 show the jets J of water at a forward longitudinal angle $\alpha$, with respect to verticality, of approximately 25°. FIG. 17 shows the jets J of water at an inward transverse angle $\beta$, with respect to verticality, of approximately 10°. Exemplary inventive practice provides for a forward longitudinal angle $\alpha$ that falls within the range between 0° and 50° inclusive, and an inward transverse angle $\beta$ that falls within the range between 0° and 20° inclusive.

Figure 18:
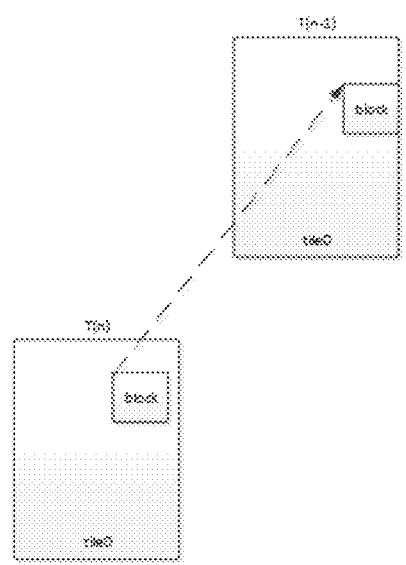
FIG. 18 is a diagram illustrating, by way of example, another inventive combination of an inventive flow-separation unit with a non-cylindrical bluff-body adjunct. The adjunct shown in FIG. 18 is representative of a variety of geometric shapes that are symmetrical with respect to a vertical axis.

Although the bluff bodies 100 shown in FIGS. 1 through 17 are cylindrical (or substantially so), it is to be understood that the present invention can be practiced with respect to bluff axisymmetric bluff bodies of a variety of geometries, including but not limited to cylinder, sphere, ovoid, ellipsoid, oblate spheroid, prolate spheroid, torus, annulus, etc., or some combination thereof that represents a bluff body. FIG. 18 merely depicts an example of the multifarious bluff body 100 shapes, cylindrical and non-cylindrical, that may be suitable for inventive practice.

Figure 19:
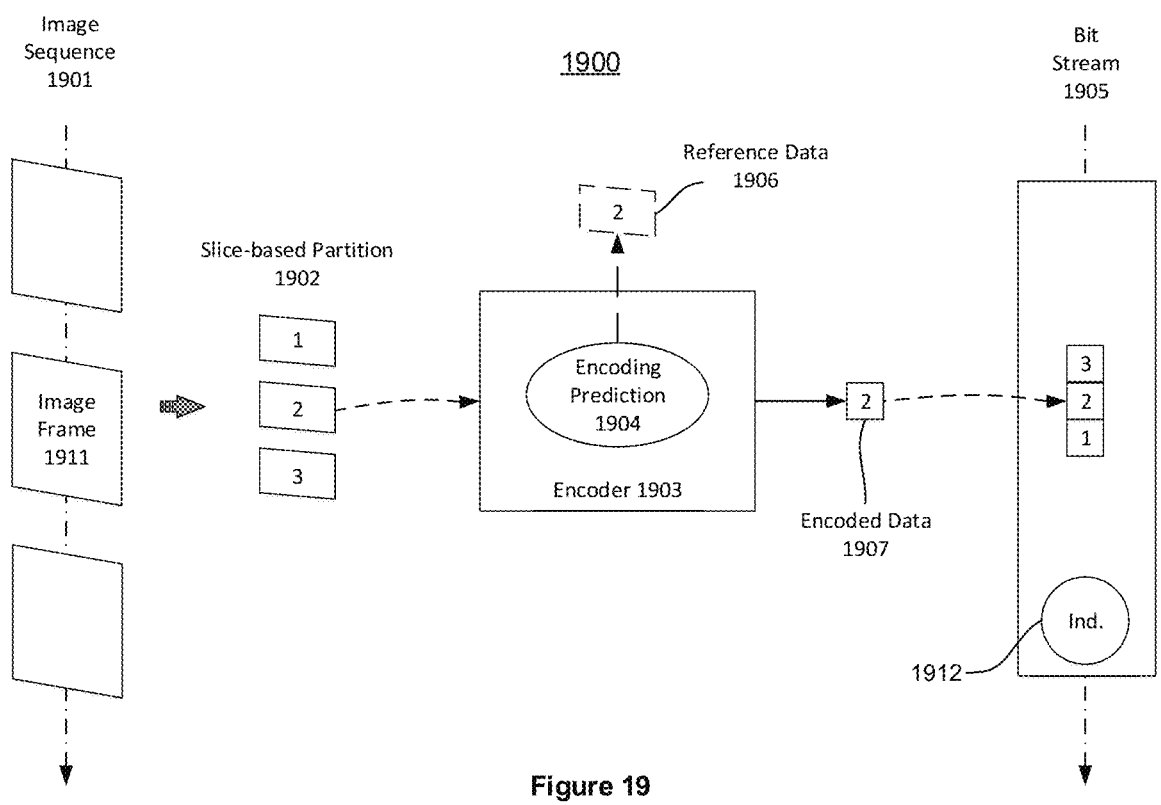
FIGS. 19 and 20 are diagrams illustrating, by way of example, an inventive combination of a single inventive flow-separation device and a cylindrical bluff body, wherein a single inventive flow-separation device is situated at one axial end of the cylindrical bluff body.
Figure 20:
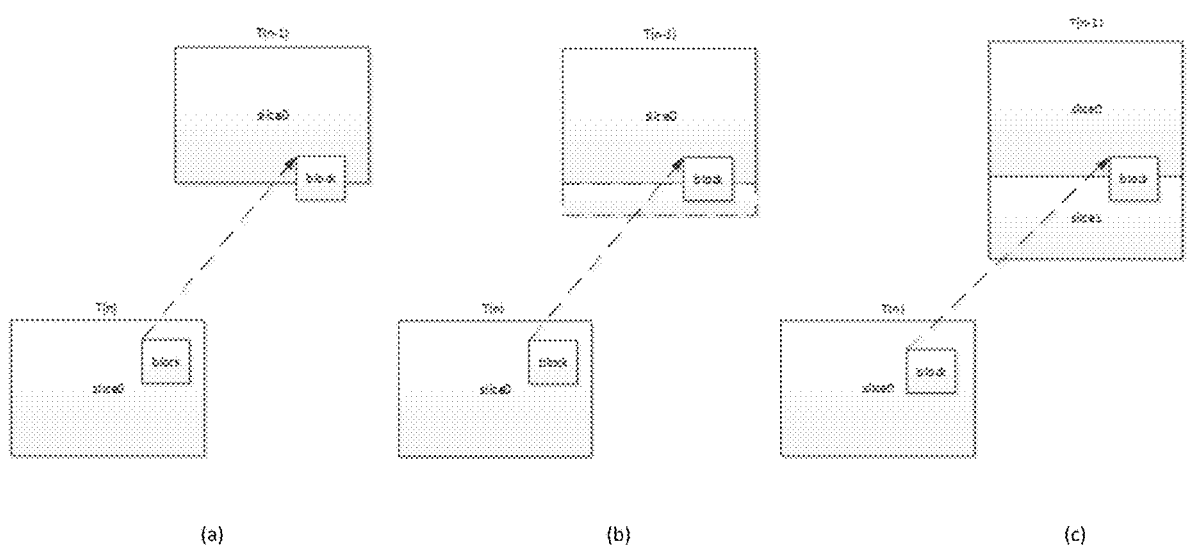

Most of the examples of inventive practice described herein provide for implementation of two inventive flow separation devices 200, e.g., 200T and 200B, situated at opposite axial ends of a bluff body 100. Now referring to FIGS. 19 and 20, the present invention can be practiced wherein only one inventive device 200 is implemented in association with a bluff body 100. FIG. 19 shows an inventive device 200T coupled with a cylindrical bluff body 100 at the axial top end of bluff body 100. FIG. 20 shows an inventive device 200B coupled with a cylindrical bluff body 100 at the axial bottom end of bluff body 100.

As shown in both FIGS. 19 and 20, waterjets J emanating from the outlets 212 of a single inventive device 200 may be sufficient for effecting separation of hydrodynamic flow in a manner such as depicted in FIG. 4. As compared with inventive implementation of two single inventive devices 200, inventive implementation of a single inventive device 200 will tend to perform more effectively for shorter heights—more specifically, for shorter ratios of height h to diameter d—such as illustrated by way of example via the respective horizontal dashed lines in FIGS. 19 and 20.

Figure 21:
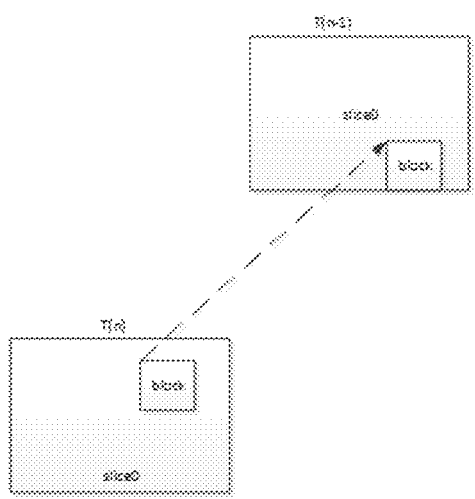
FIGS. 21 and 22 are diagrams illustrating, by way of example, an inventive combination of at least one inventive flow-separation device and at least two cylindrical bluff bodies, wherein an inventive flow-separation device is interposed between each axially adjacent pair of cylindrical bluff bodies.
Figure 22:
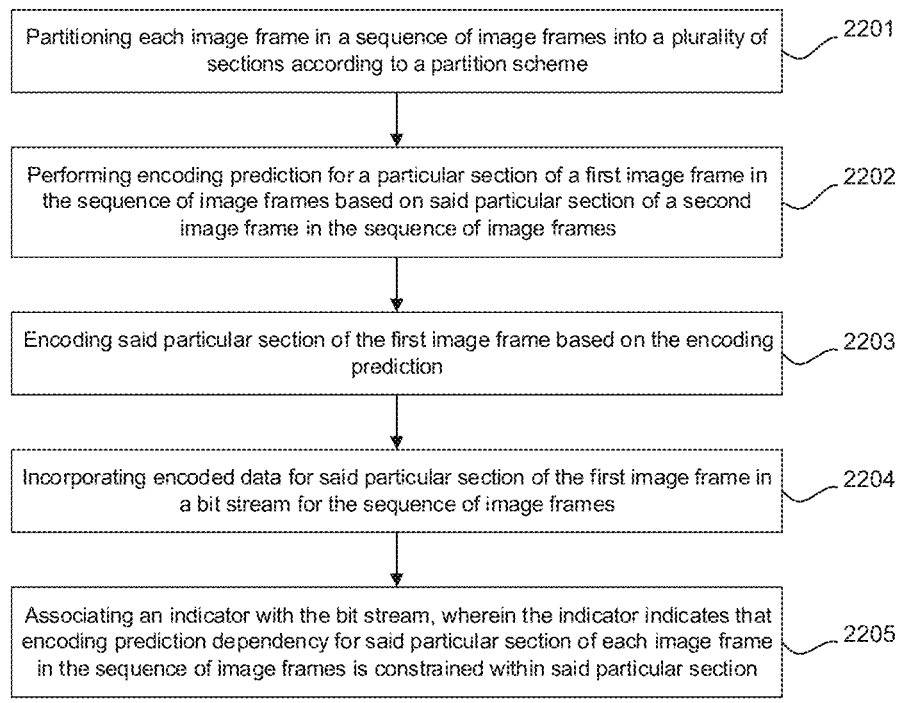
Figure 1:
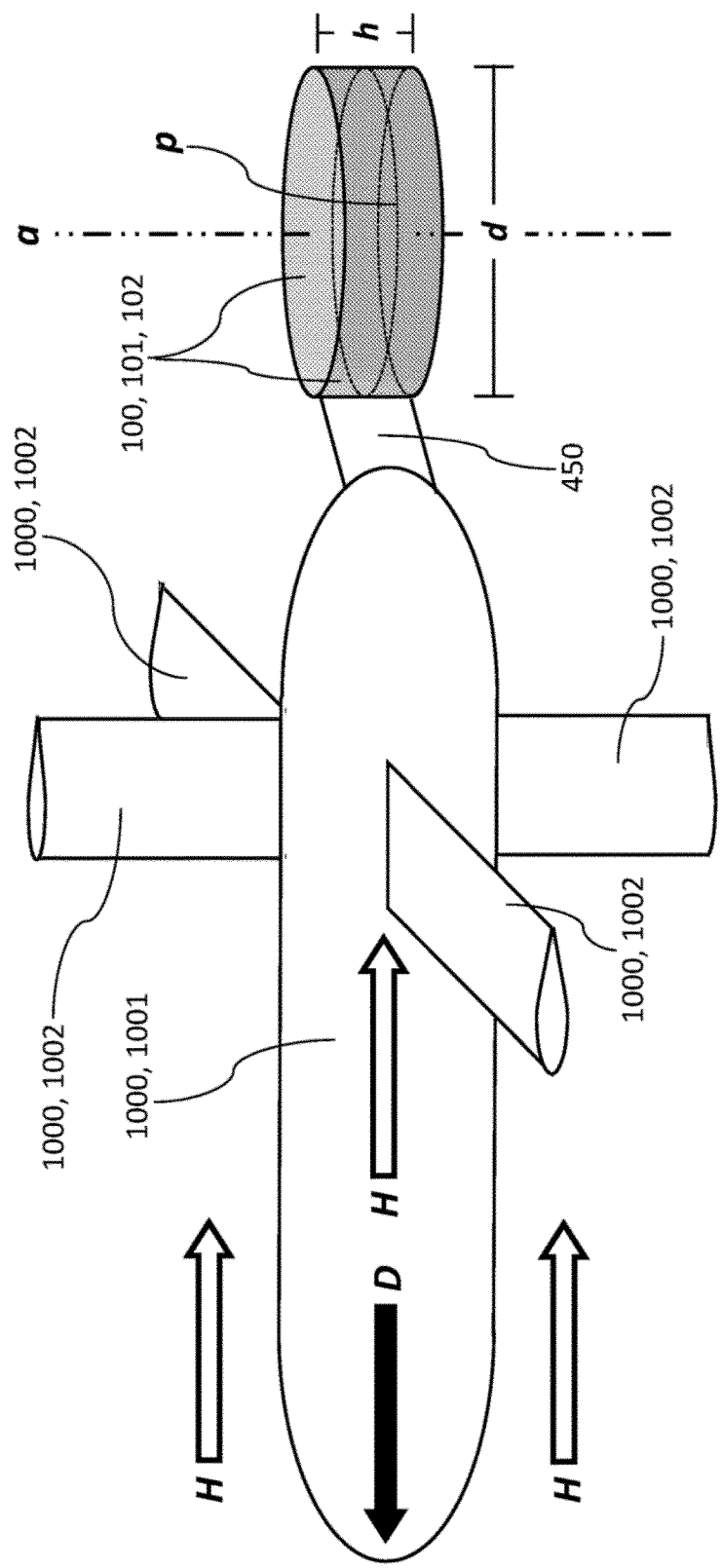
Figure 2:
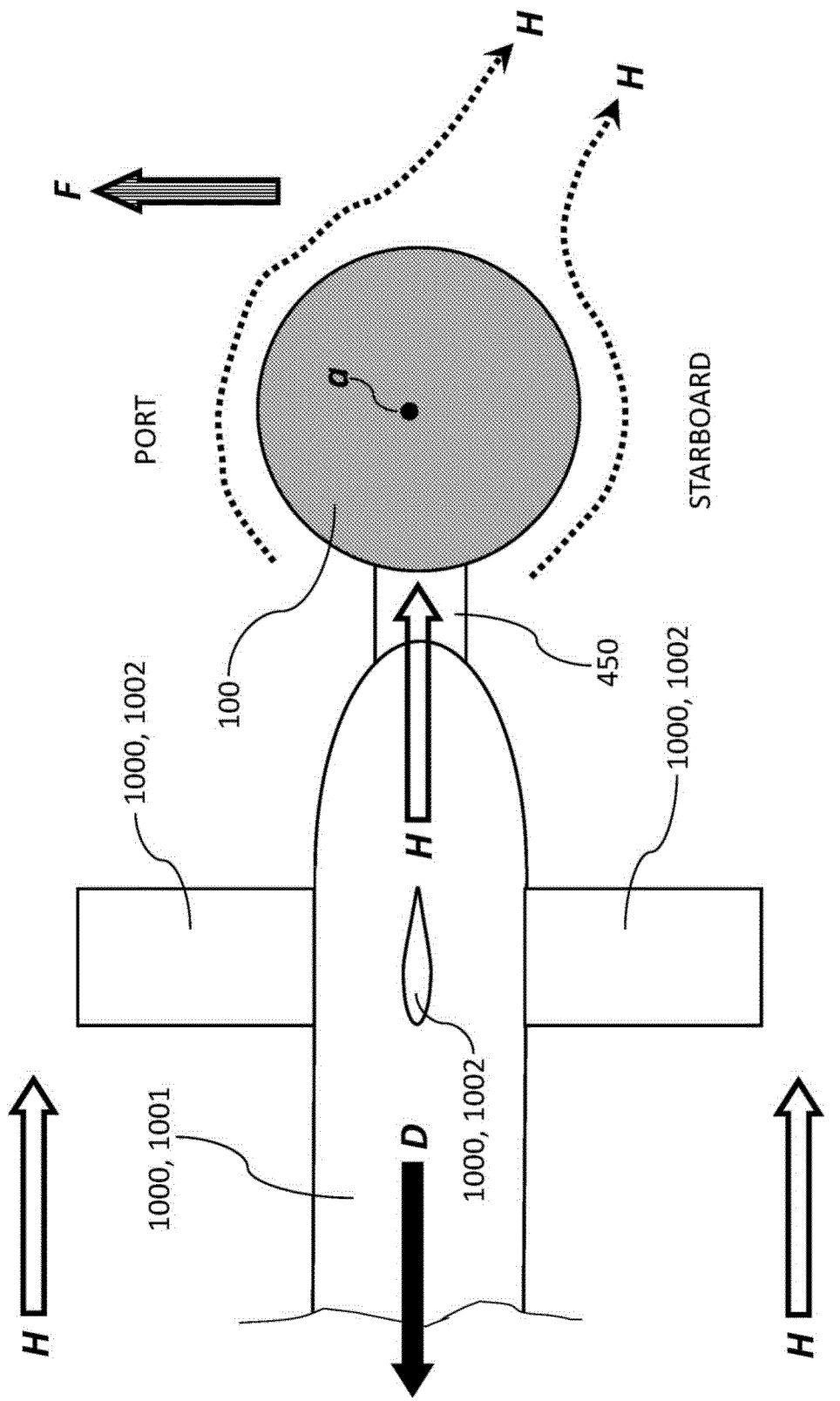
Figure 3:
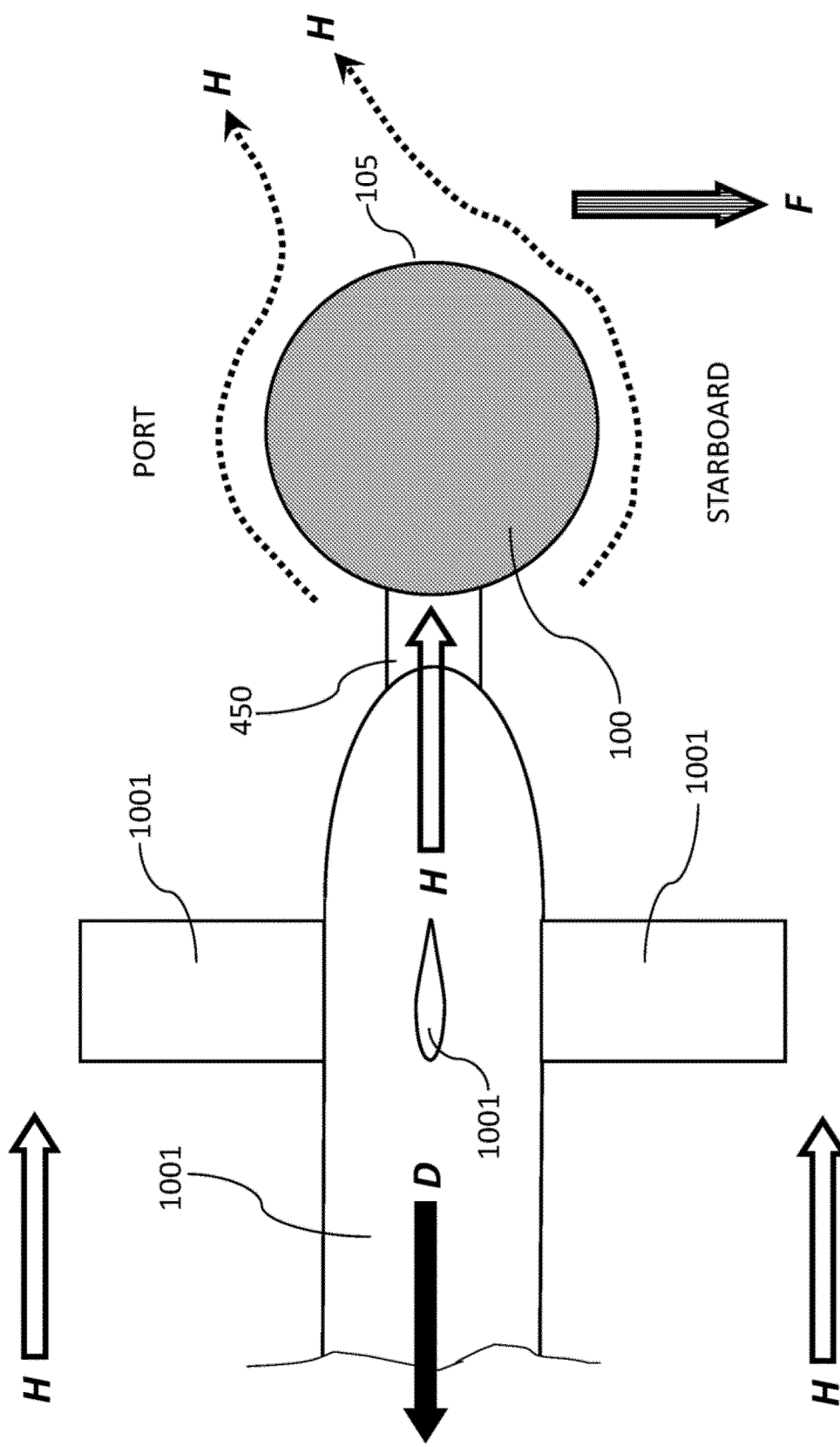
Figure 4:
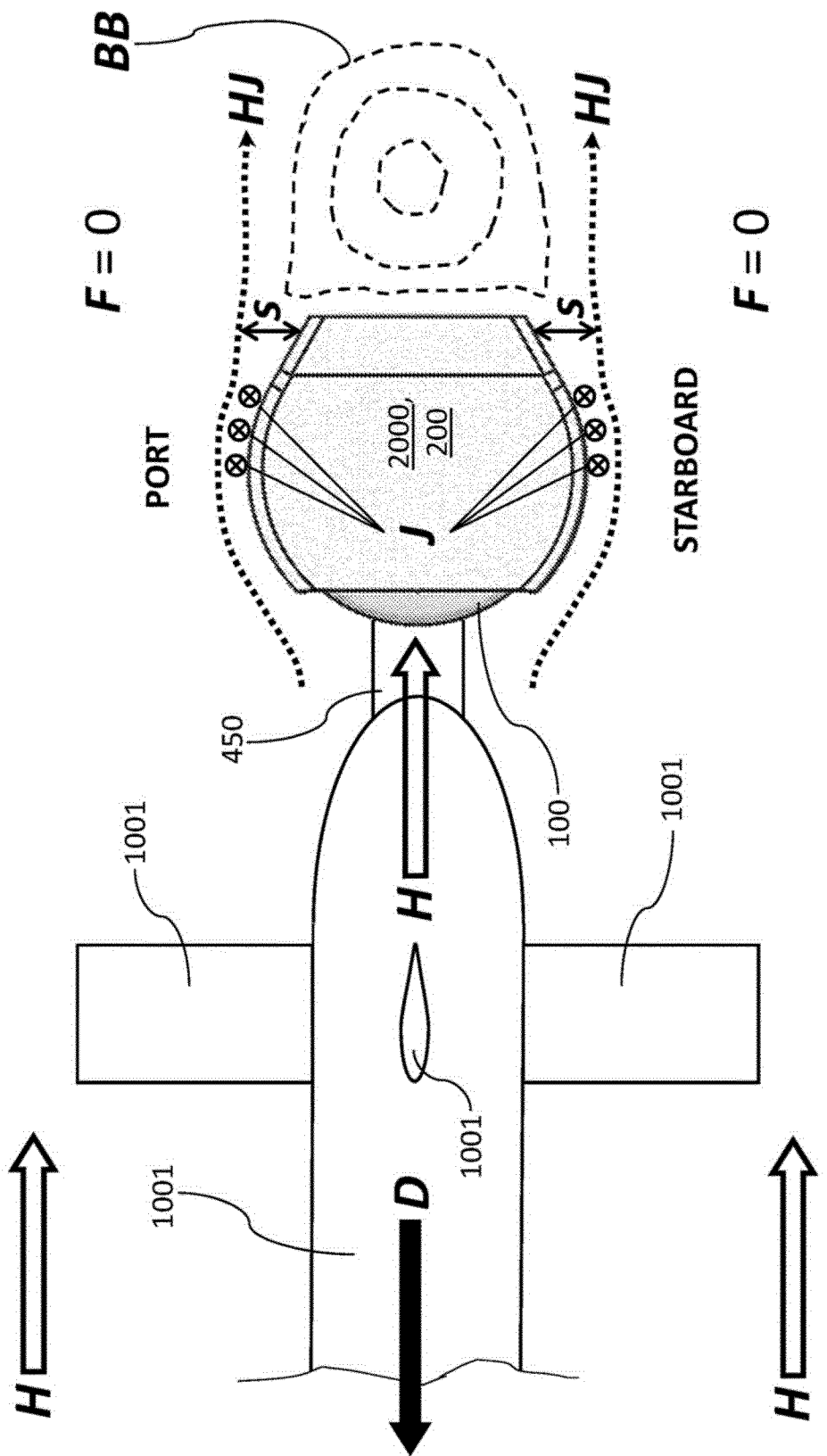
Figure 5:
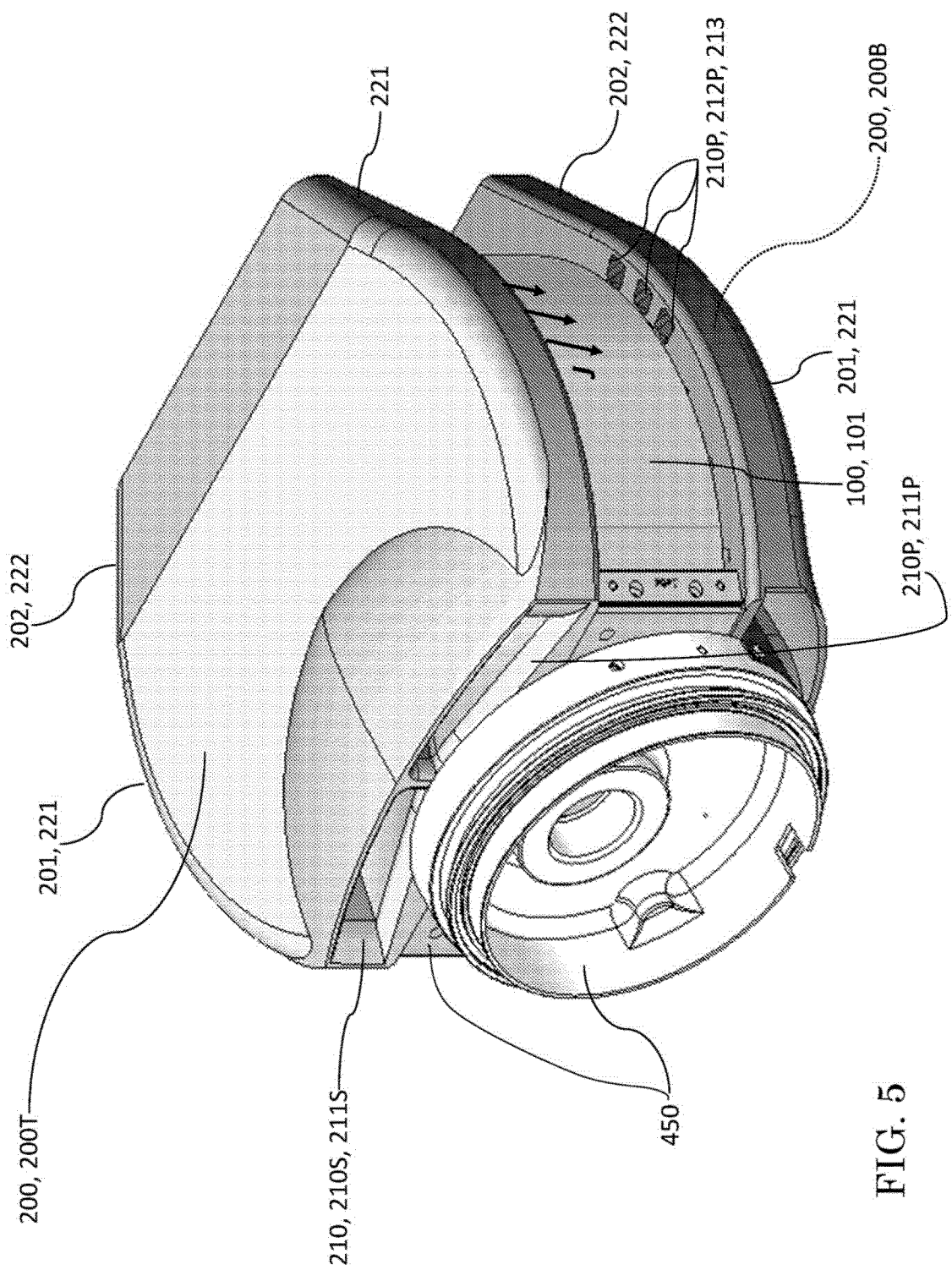
Figure 17:
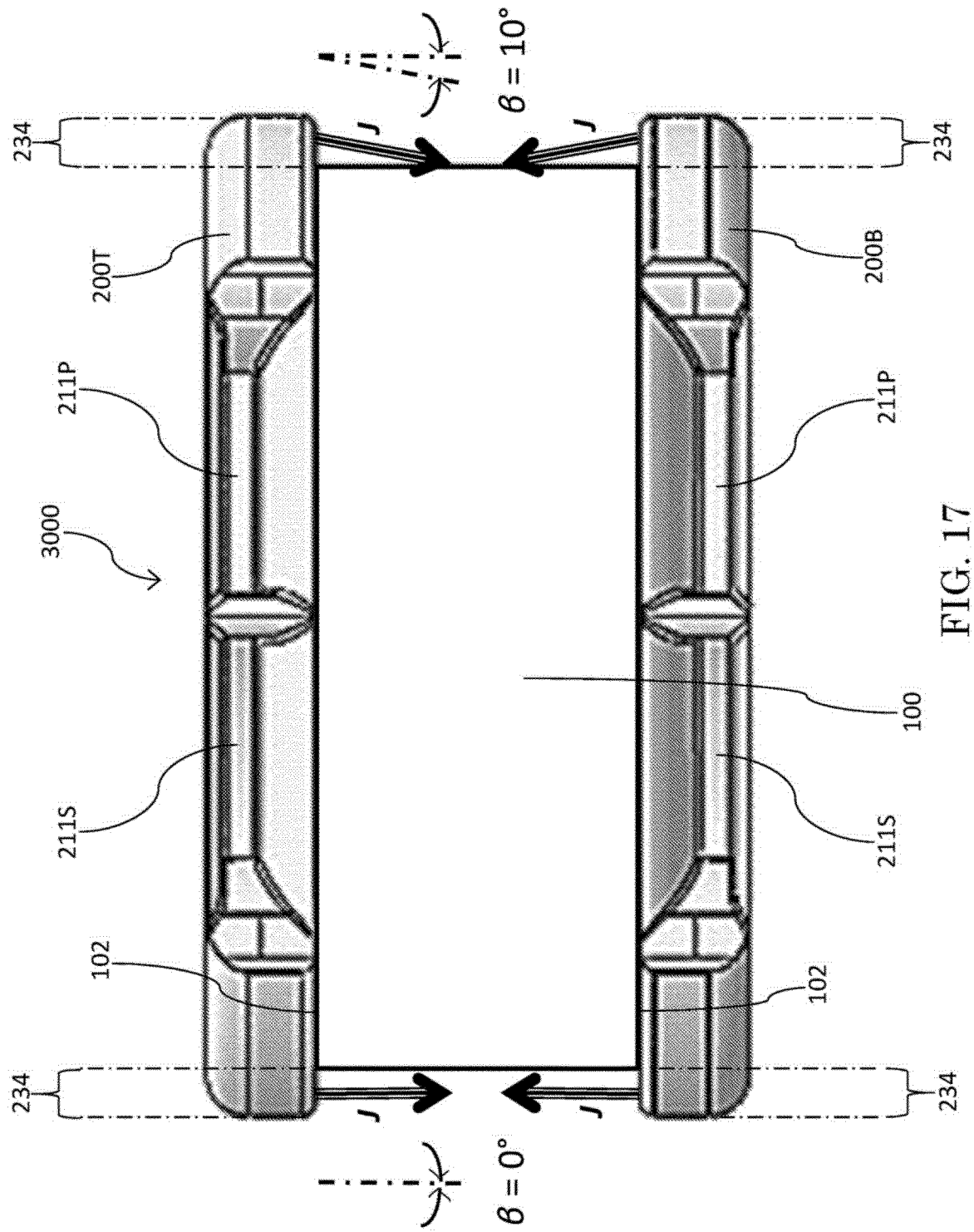

With reference to FIGS. 21 and 22, some inventive embodiments provide for an inventive assembly 4000, which includes a coaxial alternating arrangement of plural cylindrical bluff bodies 100, separated from each other by plural inventive devices 200. Each cylindrical bluff body 100 is interposed between two inventive devices 200. FIG. 21 depicts an inventive apparatus including two cylindrical bluff bodies 100. FIG. 22 depicts an inventive apparatus including three cylindrical bluff bodies 100. As shown in FIG. 21, cylindrical bluff bodies 100*a* and 100*b* and inventive devices 200Ta, 200Ba, 200Tb and 200Bb are stacked along axis a so that each of two cylindrical bluff bodies 100 is sandwiched between two inventive devices 200. Similarly, as shown in FIG. 22, cylindrical bluff bodies 100*a*, 100*b*, and 100*c* and inventive devices 200Ta, 200Ba, 200Tb, 200Bb, 200Tc, and 200Bc are stacked along axis a so that each of three cylindrical bluff bodies 100 is sandwiched between two inventive devices 200.

An inventive assembly 4000 may be considered to include a plurality of axially adjacent inventive apparatuses 3000. The inventive assembly 4000 shown in FIG. 21 has a first inventive apparatus 3000 (including top inventive device 200Ta, cylindrical bluff body 100*a*, and bottom inventive device 200Ba) and a second inventive apparatus 3000 (including top inventive device 200Tb, cylindrical bluff body 100*b*, and bottom inventive device 200Bb). The inventive assembly 4000 shown in FIG. 22 has a first inventive apparatus 3000 (including top inventive device 200Ta, cylindrical bluff body 100*a*, and bottom inventive device 200Ba), a second inventive apparatus 3000 (including top inventive device 200Tb, cylindrical bluff body 100*b*, and bottom inventive device 200Bb), and a third inventive apparatus 3000 (including top inventive device 200Tc, cylindrical bluff body 100*c*, and bottom inventive device 200Bc). An exemplary inventive method to produce an inventive assembly 4000 includes coaxially joining (e.g., fastening, adhering, or welding) plural inventive apparatuses 3000.

FIGS. 21 and 22 illustrate, by way of example, that there are: two inventive devices 200 at the opposite ends (e.g., top and bottom) of inventive assembly 4000; and, intermediate the opposite ends of inventive assembly 4000, at least one coupled pair of inventive devices 200 between each adjacent pair of cylindrical bluff bodies 100. According to some inventive embodiments, each coupled pair of intermediate inventive devices 200 is constructed or constituted as a single or integral unit characterized by a top/upper inventive device 200 (emitting generally downward jets J) and a bottom/lower inventive device 200 (emitting generally upward jets J). Moreover, inventive practice is possible wherein an entire inventive assembly 4000, including two or more coaxial inventive apparatuses 3000, is fabricated in integral fashion.

Two or more bluff bodies 100 may differ in bluff body shape, e.g., at least one bluff body 100 having a cylindrical shape and at least one bluff body 100 having a non-cylindrical shape such as shown by way of example in FIGS. 18 through 20. Practically any quantity of bluff bodies 100 and inventive devices 200 is possible in inventive practice. Depending on the inventive embodiment, the dimensions and/or material compositions of plural bluff bodies 100 may be the same or different. For instance, the diameters and/or the axial lengths of plural cylindrical bluff bodies 100 may be equal or unequal.

According to some inventive embodiments, the number of inventive devices 200 exceeds by at least one the number of cylindrical bluff bodies 100. Two inventive devices are respectively located at opposite axial ends of inventive assembly 4000. Between the axial ends of inventive assembly 400, at least one inventive device 200 is interposed between every axially adjacent pair of cylindrical bluff bodies 100. As exemplarily embodied, an at least one inventive device 200 serves to separately effectuate jet streaming J with respect to the cylindrical bluff bodies 100 between which the at late one inventive device is interposed. An at least one inventive device 200 may constitute, for instance, two adjoining inventive devices 200 or one integral inventive device 200. According to some inventive embodiments, the number of inventive devices 200 equals the number of cylindrical bluff bodies 100, wherein an inventive device 100 is present at one axial end of inventive assembly 4000 but is not present at the other axial end of inventive assembly 4000.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for effecting self-stabilizing movement in a fluidic environment, the apparatus comprising:
   an approximately cylindrical structure characterized by a geometric longitudinal axis, an axial surface, and two axial ends, said axial surface having two lateral surface areas on opposite sides of said geometric longitudinal axis;
   a device coupled with said cylindrical structure at a said axial end, said device including a fluid jet component;
   wherein, in association with forward movement of the apparatus through a fluidic medium whereby said geometric longitudinal axis is approximately vertical:
   dynamic flow of said ambient fluid includes two separate dynamic fluid flows that are respectively generally tangential to said two lateral surface areas and that are each directed generally opposite said forward movement of said approximately cylindrical structure;
   said fluid jet component intakes ambient fluid and outputs two jet fluid streams respectively flowing adjacent said two lateral surface areas of said axial surface;
   said two jet fluid streams respectively affect said two dynamic fluid flows so as to at least substantially prevent convergence of said two dynamic fluid flows behind said approximately cylindrical structure.

2. The apparatus of claim 1 wherein:
   for some distance behind said approximately cylindrical structure, said two dynamic fluid flows each continue to be directed generally opposite said forward movement of said approximately cylindrical structure;
   said device at least substantially maintains stability of said approximately cylindrical structure.

3. The apparatus of claim 1 wherein:
   said approximately cylindrical structure is characterized by a circumference;

said device is characterized by a truncated approximately circular front section and an approximately trapezoidal back section;

said approximately circular front section is characterized by a coaxiality with, and a diametrically greater approximate circularity than, said approximately cylindrical structure;

an approximately circular peripheral portion of said truncated approximately circular front section extends beyond said circumference of said approximately cylindrical structure;

said approximately trapezoidal back section narrows toward the back end of said device;

said fluid jet component releases said two jet fluid streams in a generally axial direction from respective locations in said truncated approximately circular peripheral portion of said device.

4. The apparatus of claim 1 wherein:
said device is a first said device;
said first device is coupled with said cylindrical structure at a first said axial end;
the self-stabilizing apparatus further comprises a second said device;
said second device is coupled with said cylindrical structure at a second said axial end.

5. The apparatus of claim 1, wherein:
the apparatus comprises at least two said cylindrical structures and at least one said device;
said at least two cylindrical structures and said at least one device is characterized by a coaxial assembly of said at least two cylindrical structures and said at least one device;
at least one said device is interposed between each axially adjacent pair of said two cylindrical structures.

6. The apparatus of claim 1, wherein:
the apparatus comprises at least two said cylindrical structures and at least two said devices;
said at least two cylindrical structures and said at least two devices are characterized by a coaxial assembly of said at least two cylindrical structures and said at least two devices and are further characterized by two coaxial assembly ends of said coaxial assembly;
at least one said device is interposed between each axially adjacent pair of said two cylindrical structures;
at least one said device is coupled with a said cylindrical structure at a said coaxial assembly end.

7. The apparatus of claim 1, wherein:
the apparatus comprises at least two said cylindrical structures and at least three said devices;
said at least two cylindrical structures and said at least three devices are characterized by a coaxial assembly of said at least two cylindrical structures and said at least three devices and are further characterized by two coaxial assembly ends of said coaxial assembly;
at least one said device is interposed between each axially adjacent pair of said two cylindrical structures;
at least a first said device is coupled with a said cylindrical structure at a first said coaxial assembly end;
at least a second said device is coupled with a said cylindrical structure at a second said coaxial assembly end.

8. A method for stabilizing an approximately cylindrical vehicular structure characterized by a geometric longitudinal axis, an axial surface, and two axial ends, said axial surface having two lateral surface areas on opposite sides of said geometric longitudinal axis, the method comprising:

coupling a device with said approximately cylindrical vehicular structure at a said axial end, said device including a fluid jet component;

causing said approximately cylindrical vehicular structure, having said device coupled therewith, to move forward through a fluidic medium whereby said cylindrical axis is approximately vertical;

wherein, in association with forward movement of said approximately cylindrical vehicular structure through a fluidic medium whereby said geometric longitudinal axis is approximately vertical:

dynamic flow of said ambient fluid includes two separate dynamic fluid flows that are respectively generally tangential to said two lateral surface areas and that are each directed generally opposite said forward movement of said approximately cylindrical vehicular structure;

said fluid jet component intakes ambient fluid and outputs two jet fluid streams respectively flowing adjacent said two lateral surface areas of said axial surface;

said two jet fluid streams respectively affect said two dynamic fluid flows so as to at least substantially prevent convergence of said two dynamic fluid flows behind said approximately cylindrical vehicular structure.

9. The method for stabilizing of claim 8 wherein:
for some distance behind said approximately cylindrical vehicular structure, said two dynamic fluid flows each continue to be directed generally opposite said forward movement of said approximately cylindrical vehicular structure;
said device at least substantially maintains stability of said approximately cylindrical vehicular structure.

10. The method for stabilizing of claim 8 wherein:
said approximately cylindrical vehicular structure is characterized by a circumference;
said device is characterized by a truncated approximately circular front section and an approximately trapezoidal back section;
said approximately circular front section is characterized by a coaxiality with, and a diametrically greater approximate circularity than, said approximately cylindrical vehicular structure;
an approximately circular peripheral portion of said truncated approximately circular front section extends beyond said circumference of said approximately cylindrical vehicular structure;
said approximately trapezoidal back section narrows toward the back end of said device;
said fluid jet component releases said two jet fluid streams in a generally axial direction from respective locations in said truncated approximately circular peripheral portion of said device.

11. The method for stabilizing of claim 8 wherein:
said device is a first said device;
said first device is coupled with said approximately cylindrical vehicular structure at a first said axial end;
the method further comprises coupling a second said device with said approximately cylindrical vehicular structure at a second said axial end.

12. Hydrodynamic apparatus for use in association with an axisymmetric bluff body characterized by an approximately vertical geometric axis, two axial ends, and an exterior axial surface, the hydrodynamic apparatus comprising a device characterized by a substantially linear front edge, two curvilinear side edges, an approximately horizontal longitudinal geometric axis approximately perpendicular to said substantially linear front edge, and substantial axial symmetry with respect to said approximately horizontal longitudinal geometric axis, said device including a conduit for intake of hydrodynamic flow at said substantially linear front edge and for output of jet streaming at each said curvilinear side edge, said device being attachable to said axisymmetric bluff body at a said axial end so that said approximately horizontal longitudinal geometric axis and said approximately vertical geometric axis approximately perpendicularly intersect, wherein interaction of said jet streaming with at least some said hydrodynamic flow that is tangential to said exterior axial surface of a moving said axisymmetric body results in separation of at least some said tangential hydrodynamic flow from said exterior axial surface.

13. The hydrodynamic apparatus of claim 12 wherein, during said interaction, said jet streaming is directed generally along said exterior axial surface of said bluff body and approximately perpendicular to said hydrodynamic flow.

14. The hydrodynamic apparatus of claim 13 wherein:
said device is a first said device;
the hydrodynamic apparatus further comprises a second said device;
the first said device is attachable to said axisymmetric bluff body at a first said axial end;
the second said device is attachable to said axisymmetric bluff body at a second said axial end;
during said interaction, said jet streaming from the first said device is directed generally toward the second said device, and said jet streaming from the second said device is directed generally toward the first said device.

15. The hydrodynamic apparatus of claim 12 wherein:
each said curvilinear side edge includes a curved front side edge portion and a substantially linear back side edge portion that is tapered aftward toward said substantially horizontal longitudinal geometric axis;
said conduit is for output of said jet streaming at each said curved front side edge portion;
said substantially linear back side edge portions act to streamline at least some said tangential hydrodynamic flow with which said jet streaming interacts.

16. The hydrodynamic apparatus of claim 15 wherein:
said device is further characterized by a front section, a back section, and a substantially linear back edge;
said approximately horizontal longitudinal geometric axis is approximately perpendicular to said substantially linear back edge;
said front section of said device is delimited by said substantially linear front edge and each said curved front side edge portion;
said back section of said device is delimited by said substantially linear back edge and each said substantially linear back side edge portion.

17. The hydrodynamic apparatus of claim 16 wherein said curved section of said device substantially conforms with the shape of said axisymmetric bluff body to which said device is attached.

18. The hydrodynamic apparatus of claim 12 wherein said axisymmetric bluff body is a substantially cylindrical bluff body, said two axial ends are substantially circular axial ends, and said exterior axial surface is a substantially cylindrical axial surface.

19. The hydrodynamic apparatus of claim 18 wherein, during said interaction, said jet streaming is directed generally along said exterior axial surface of said bluff body and approximately perpendicular to said hydrodynamic flow.

20. The hydrodynamic apparatus of claim 19 wherein:
said device is a first said device;
the hydrodynamic apparatus further comprises a second said device;
the first said device is attachable to said substantially cylindrical bluff body at a first said axial end;
the second said device is attachable to said substantially cylindrical bluff body at a second said axial end;
during said interaction, said jet streaming from the first said device is directed generally toward the second said device, and said jet streaming from the second said device is directed generally toward the first said device.

21. The hydrodynamic apparatus of claim 18 wherein:
each said curvilinear side edge includes a curved front side edge portion and a substantially linear back side edge portion that is tapered aftward toward said substantially horizontal longitudinal geometric axis;
said conduit is for output of said jet streaming at each said curved front side edge portion;
said substantially linear back side edge portions act to streamline at least some said tangential hydrodynamic flow with which said jet streaming interacts.

22. The hydrodynamic apparatus of claim 21 wherein:
said device is further characterized by a front section, a back section, and a substantially linear back edge;
said approximately horizontal longitudinal geometric axis is approximately perpendicular to said substantially linear back edge;
said front section of said device is delimited by said substantially linear front edge and each said curved front side edge portion;
said back section of said device is delimited by said substantially linear back edge and each said substantially linear back side edge portion.

23. The hydrodynamic apparatus of claim 22 wherein said curved section of said device substantially conforms with the substantially cylindrical shape of said axisymmetric bluff body to which said device is attached.

* * * * *

UNITED STATES PATENT AND TRADEMARK OFFICE
CERTIFICATE OF CORRECTION

| | | |
|---|---|---|
| PATENT NO. | : 10,899,417 B1 | |
| APPLICATION NO. | : 16/439108 | |
| DATED | : January 26, 2021 | |
| INVENTOR(S) | : David B. Coakley et al. | |

It is certified that error appears in the above-identified patent and that said Letters Patent is hereby corrected as shown below:

Please delete patent 10,899,417 B1 in its entirety and insert patent 10,899,417 B1 in its entirety.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*

(12) United States Patent
Coakley et al.

(10) Patent No.: US 10,899,417 B1
(45) Date of Patent: Jan. 26, 2021

(54) HYDRODYNAMIC FLOW SEPARATION DEVICE FOR AN AXISYMMETRIC BLUFF BODY

(71) Applicant: The United States of America, as represented by the Secretary of the Navy, Arlington, VA (US)

(72) Inventors: David B. Coakley, Alexandria, VA (US); Stephen M. Shepherd, Washington, DC (US); David A. Newborn, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/439,108

(22) Filed: Jun. 12, 2019

(51) Int. Cl.
*B63B 1/32* (2006.01)
*B63B 1/36* (2006.01)
*F03B 17/06* (2006.01)
*B63B 1/34* (2006.01)

(52) U.S. Cl.
CPC ............... *B63B 1/322* (2013.01); *B63B 1/34* (2013.01); *B63B 1/36* (2013.01); *F03B 17/061* (2013.01); *F05B 2240/97* (2013.01)

(58) Field of Classification Search
CPC .. B63B 1/322; B63B 1/34; B63B 1/36; B63B 35/44; B63H 11/00; B63H 11/02; B63H 11/04; F03B 17/061
USPC ........................................ 114/67 A, 67 R, 274
See application file for complete search history.

(56) References Cited

U.S. PATENT DOCUMENTS

| | | | |
|---|---|---|---|
| 2,969,759 A * | 1/1961 | Giles | B63B 1/34 114/67 A |
| 3,205,846 A * | 9/1965 | Lang | B63B 1/38 114/67 A |
| 3,779,199 A * | 12/1973 | Mayer, Jr. | B63B 1/36 114/337 |
| 5,158,251 A | 10/1992 | Taylor | |
| 6,148,751 A | 11/2000 | Brown et al. | |
| 6,349,664 B1 | 2/2002 | Brown et al. | |
| (Continued) | | | |

OTHER PUBLICATIONS

J.B. Freund and M.G. Mungal, "Drag and Wake Modification of Axisymmetric Bluff Bodies Using Coanda Blowing," Journal of Aircraft, vol. 31, No. 3, pp. 572-578, May-Jun. 1994.

*Primary Examiner* — Lars A Olson
(74) *Attorney, Agent, or Firm* — Howard Kaiser

(57) ABSTRACT

In the absence of inventive practice, the hydrodynamic flows on both sides of a vertically oriented bluff body (e.g., cylinder) traveling through water tend to hug the bluff body proximate its curved back surface and to converge behind the bluff body, resulting in lateral sway of the bluff body. Exemplary inventive practice provides for attachment of a pair of waterjet-streaming devices at opposite axial ends of a bluff body such as a cylinder. The waterjet streams discharged by the two inventive devices, which adjoin the vertical bluff body, deflect the hydrodynamic flows on both curved side surfaces of the bluff body. The inventive apparatus thereby encourages a continued approximate parallelity of the hydrodynamic flows behind the bluff body, resulting in significantly greater stability of the bluff body. Some exemplary embodiments of the present invention provide for attachment of a single waterjet-streaming device at one axial end of the bluff body.

23 Claims, 13 Drawing Sheets

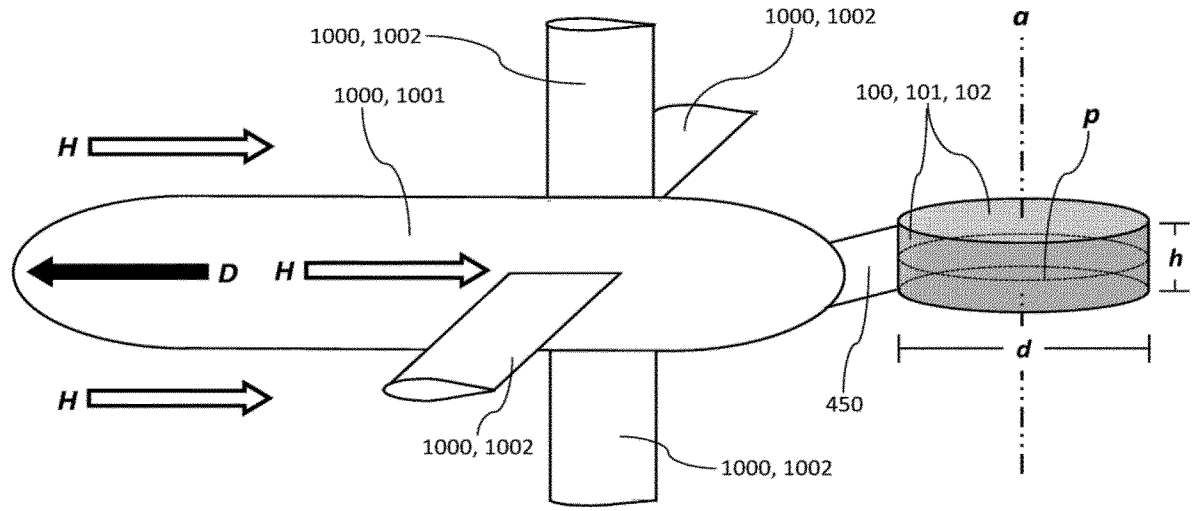

(56) References Cited

U.S. PATENT DOCUMENTS

| | | | |
|---|---|---|---|
| 6,701,862 B2 * | 3/2004 | Hilleman | B63G 8/08 |
| | | | 114/338 |
| 6,725,797 B2 * | 4/2004 | Hilleman | B63H 11/08 |
| | | | 114/337 |
| 7,108,457 B1 | 9/2006 | Brown et al. | |
| 7,226,325 B1 * | 6/2007 | Kirschner | B63B 1/38 |
| | | | 114/67 A |
| 10,286,983 B1 | 5/2019 | Coakley | |

* cited by examiner

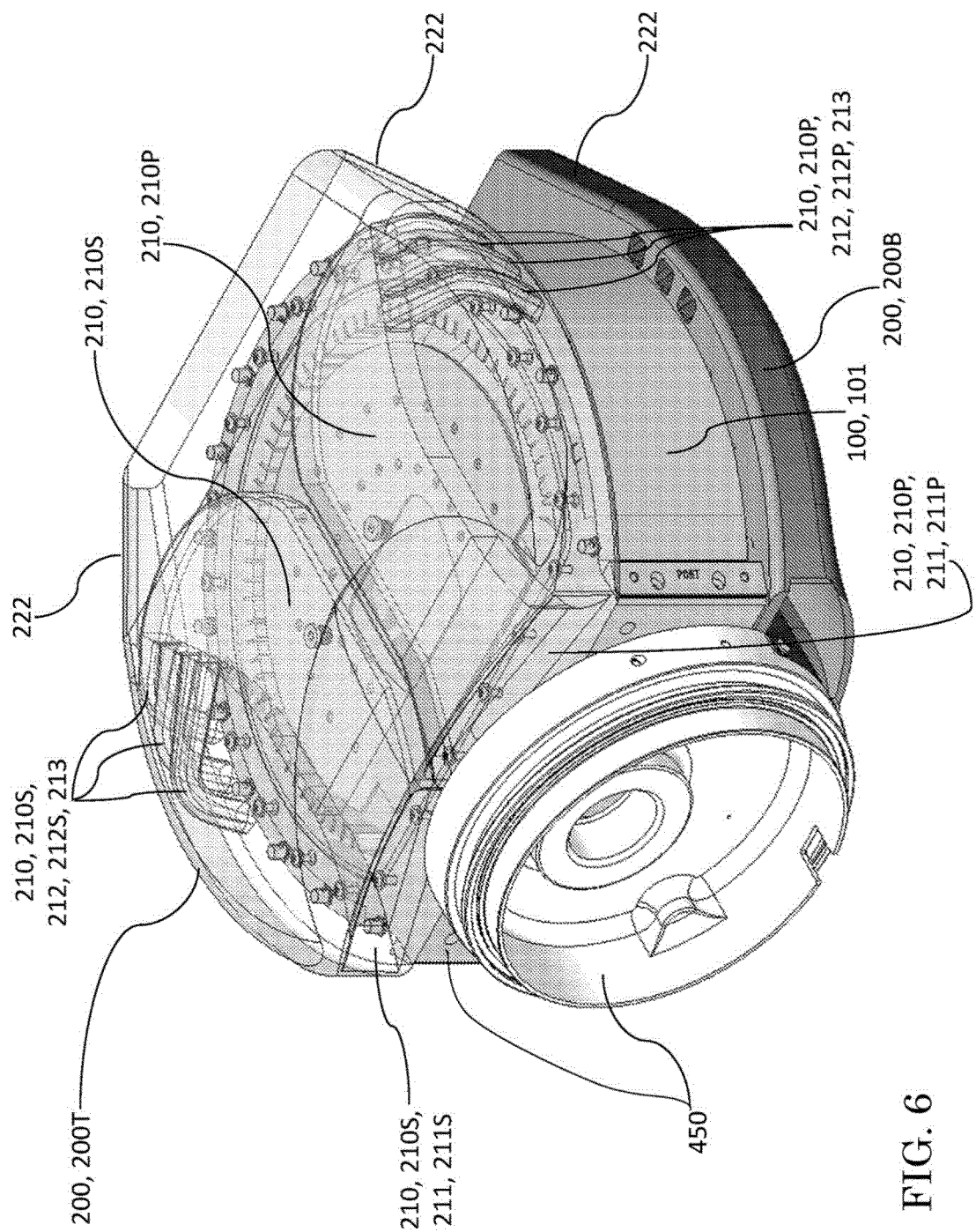

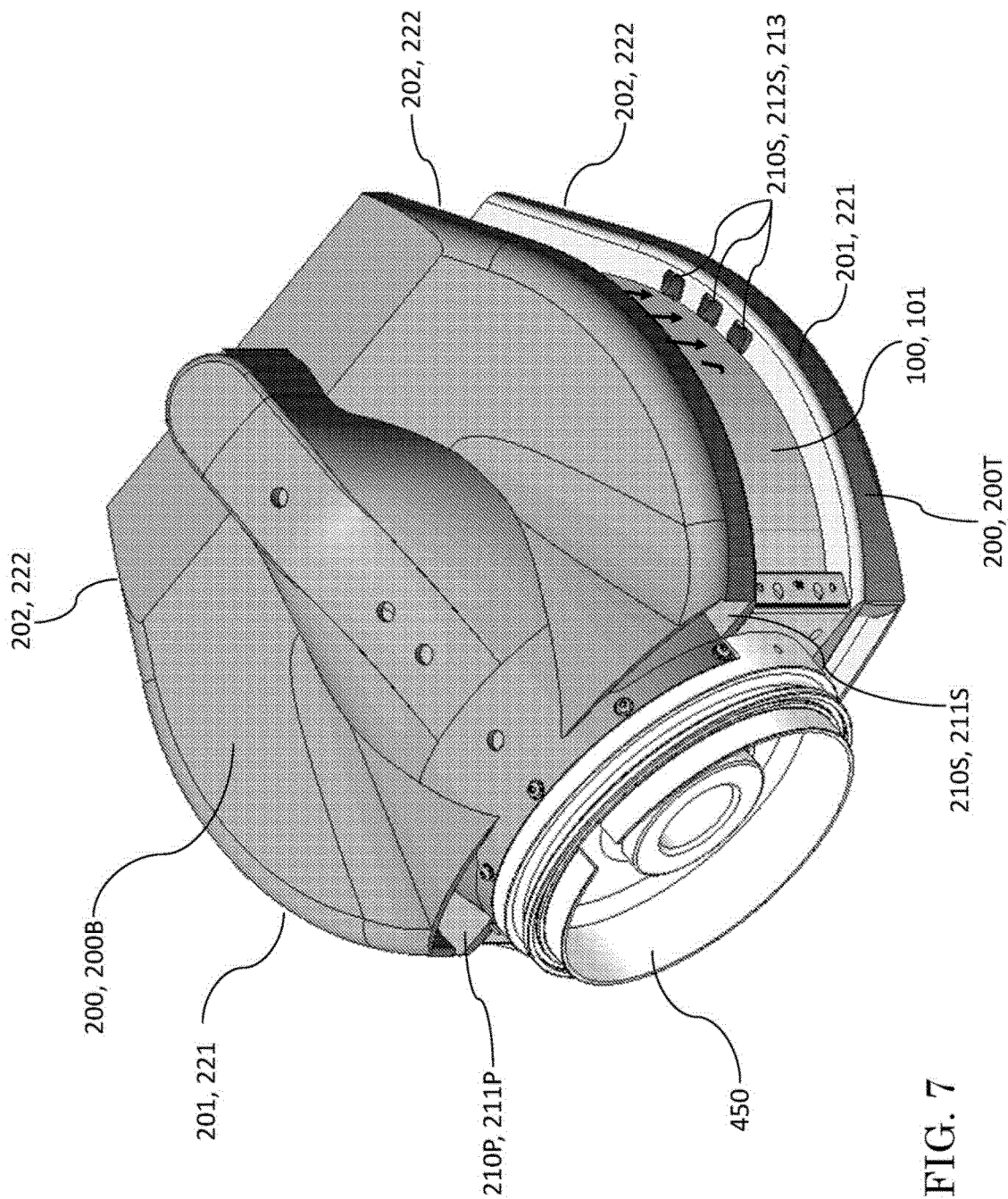

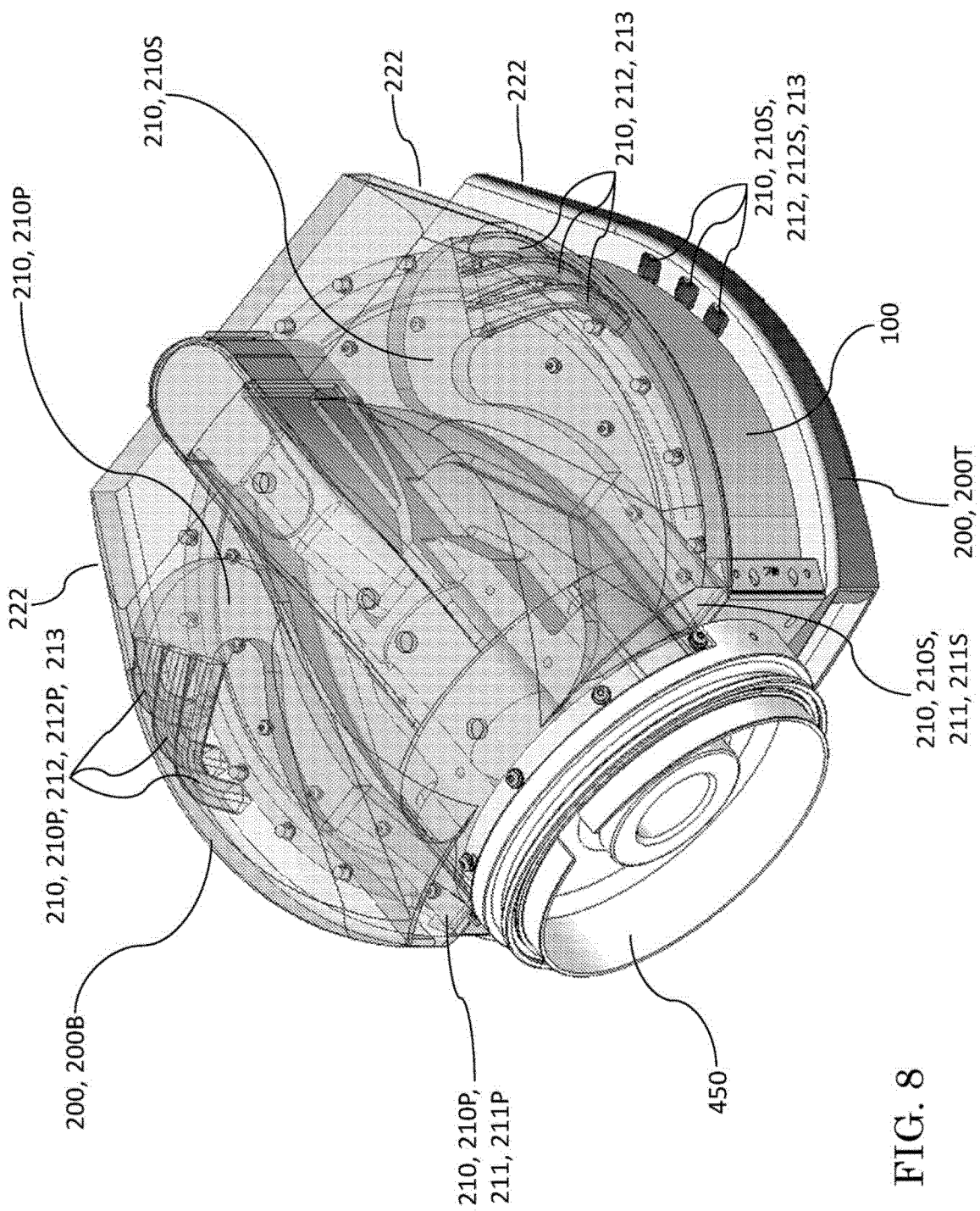

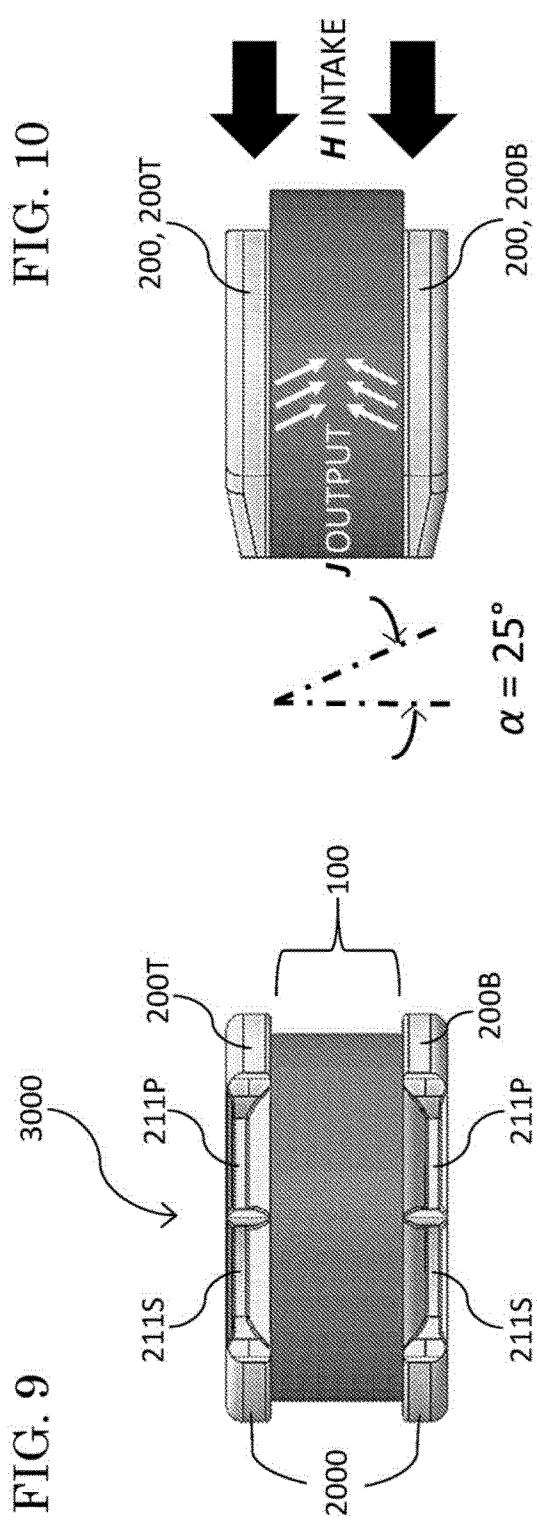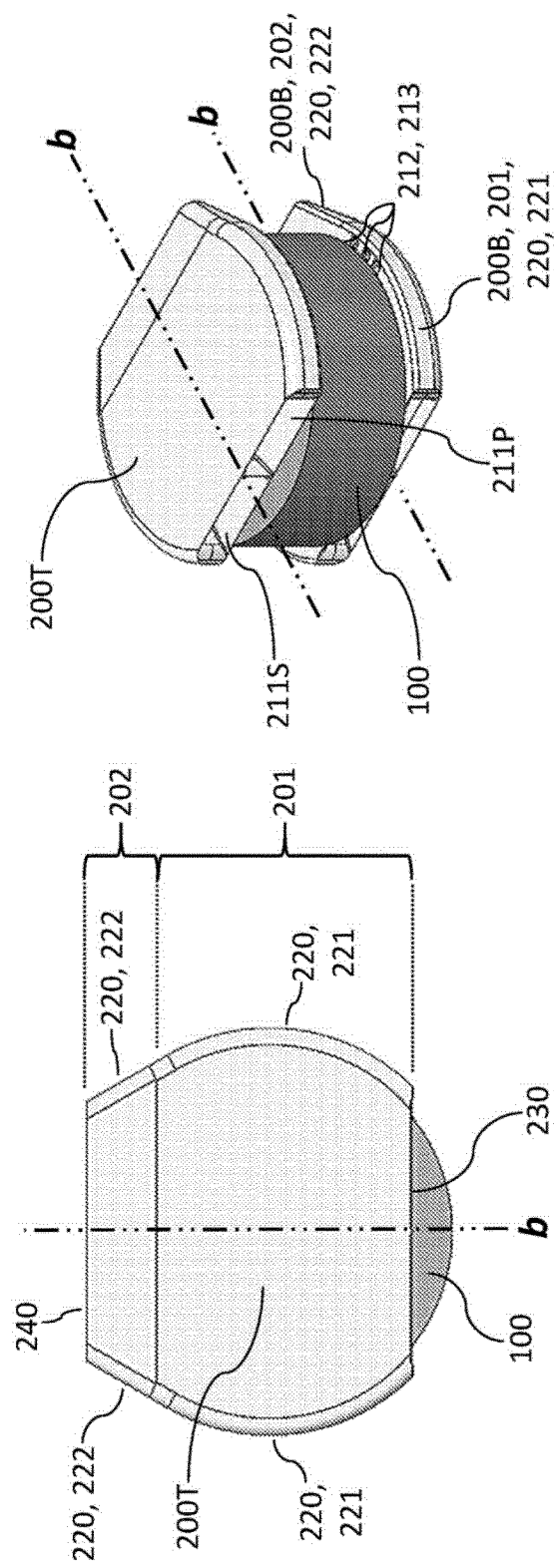

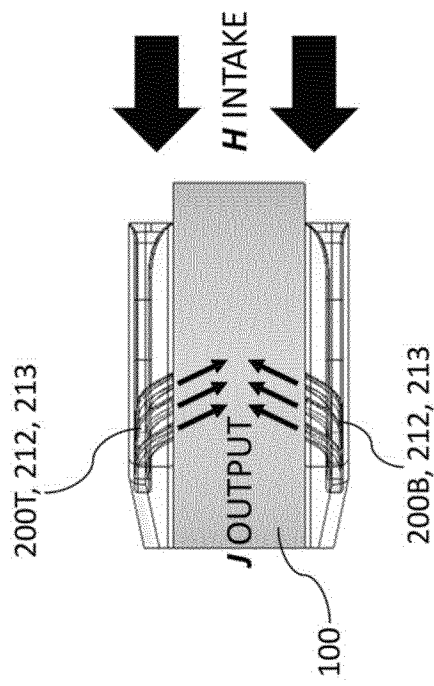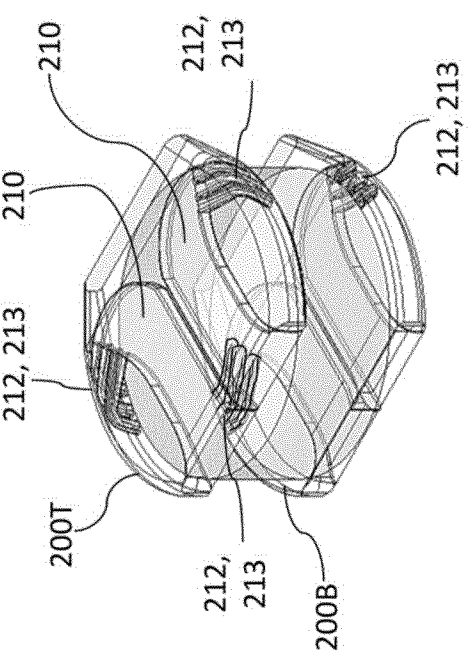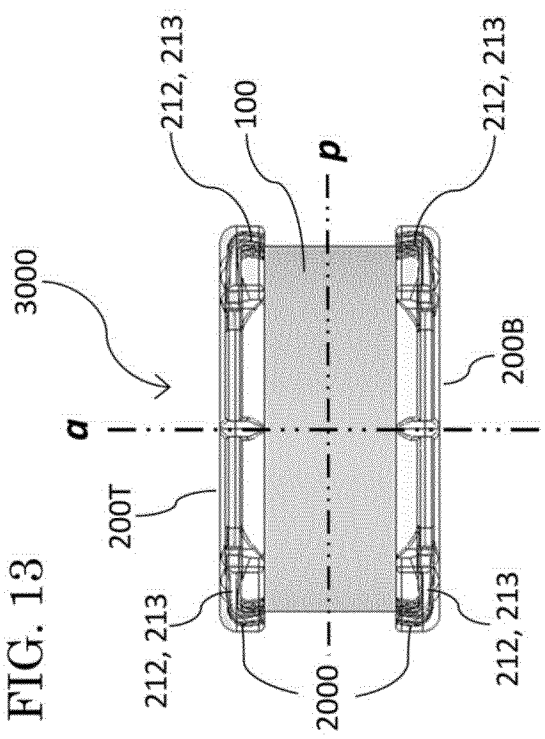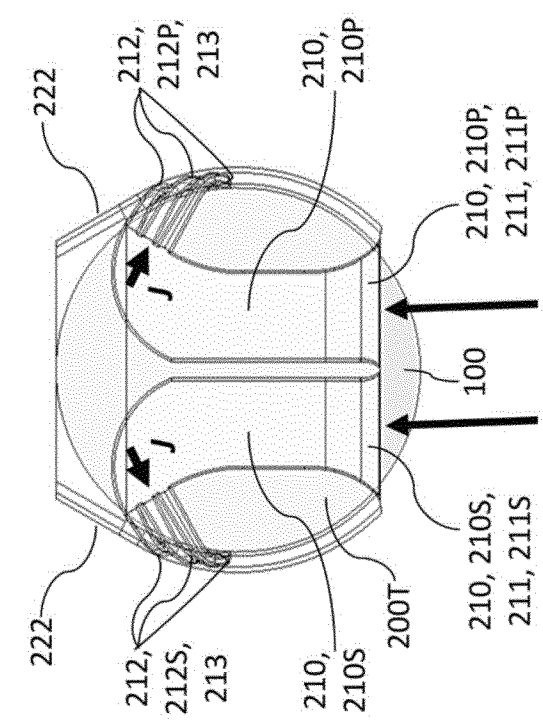

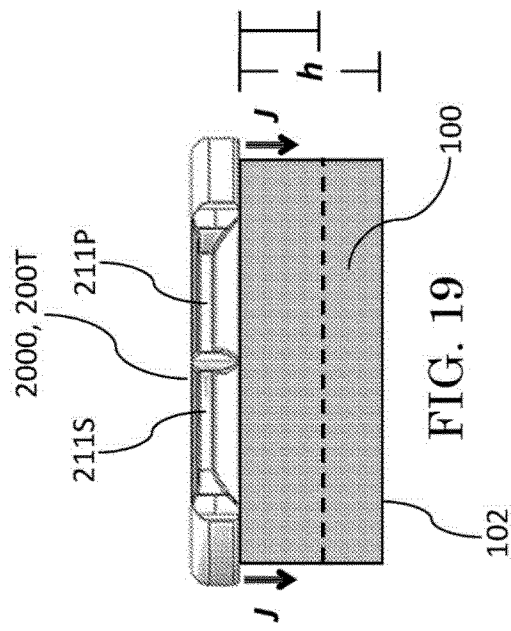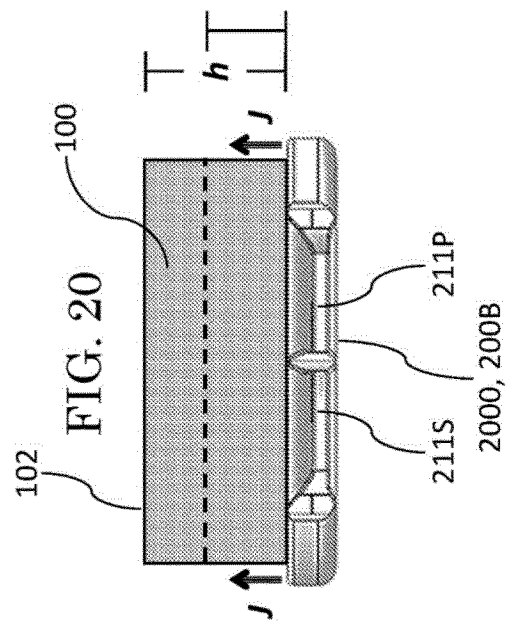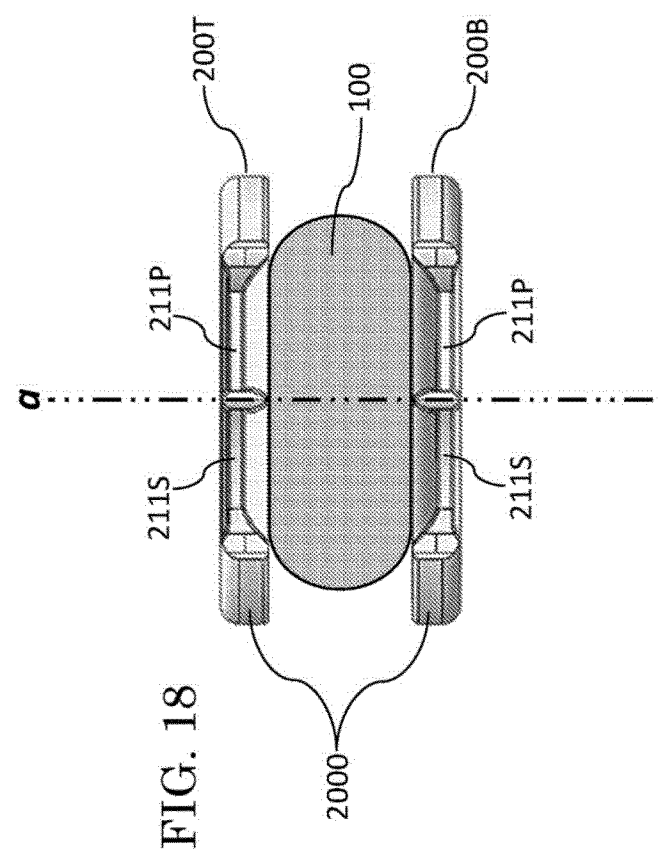

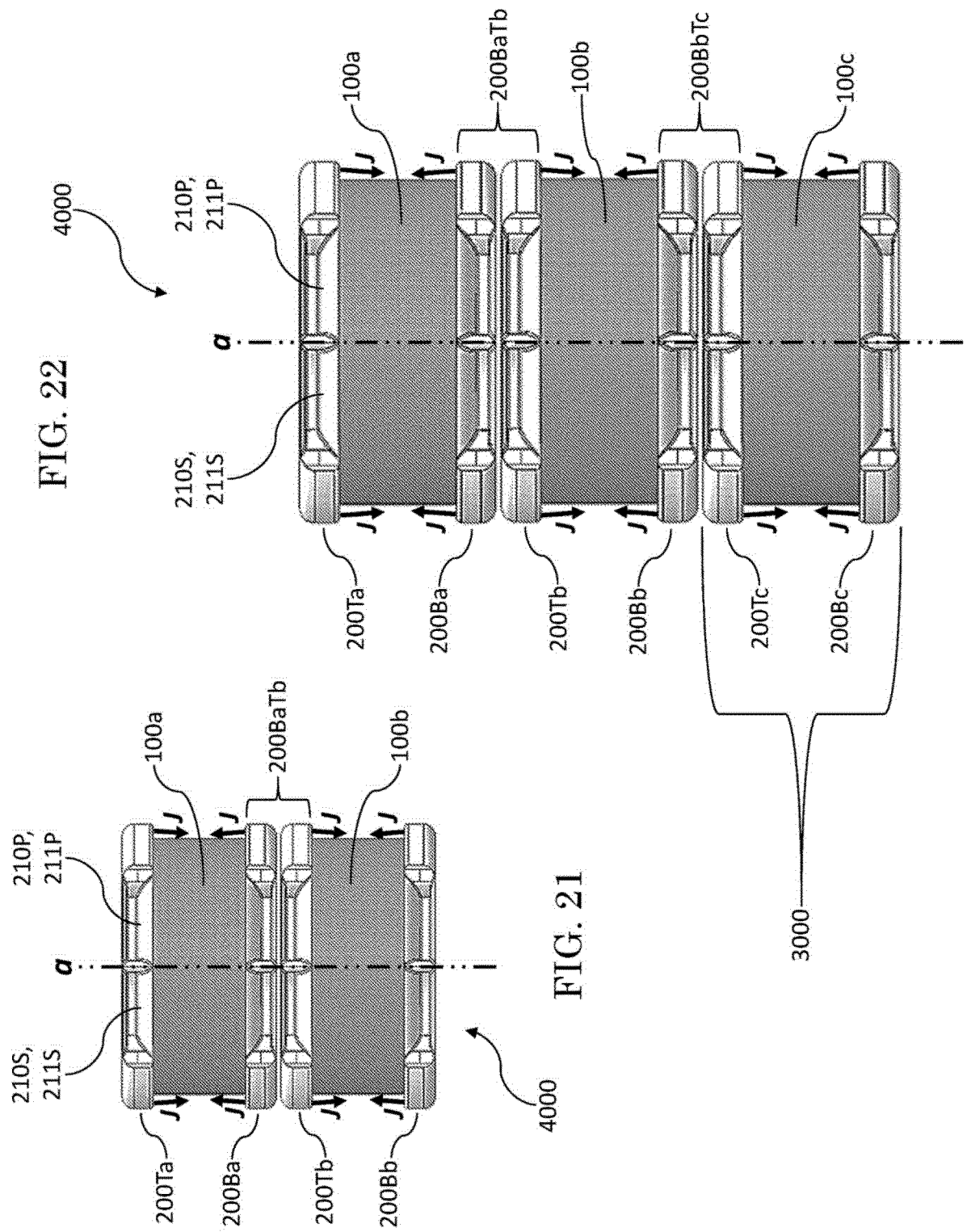

HYDRODYNAMIC FLOW SEPARATION DEVICE FOR AN AXISYMMETRIC BLUFF BODY

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to the hydrodynamics of bluff bodies, more particularly to methods and apparatuses for changing or influencing the hydrodynamics associated with situation of a bluff body at or near the aft end of a marine vessel.

In the parlance of the fluid dynamic arts, a distinction may be drawn between a "bluff body" and a "streamlined body" in describing the shape of a body and the drag forces experienced by the body when moving through a fluid. Generally speaking, regardless of whether a body is bluff or streamlined, the body will encounter both frictional drag (also known as viscous drag) and pressure drag. Typically, a bluff body will predominately experience pressure drag, whereas a streamlined body will predominately experience friction drag.

The performance of a vehicle moving through water or air may be largely determined by the drag forces exerted upon the vehicle. For instance, the hydrodynamics of a marine vessel may be significantly altered by the coupling of adjunctive structure with the vessel. A case in point is a vertical cylindrical adjunct attached at the rear of a marine vessel for purposes of housing sensors or other instrumentation. The adjunct in this case is a bluff body by virtue of its cylindrical shape. It may be desirable to mitigate the deleterious hydrodynamic consequences of such structural placement.

SUMMARY OF THE INVENTION

In view of the foregoing, an object of the present invention is to provide method and apparatus for attenuating the hydrodynamic effects of a bluff body that is integrated with or attached to a marine body at or near the rear of the marine body, such as an adjunctive bluff body placed aft of a marine vessel.

The present invention represents a novel hydraulic methodology for beneficially affecting hydrodynamics involving bluff bodies in association with marine vessels. As exemplarily embodied, the present invention provides a hydrodynamic stabilization apparatus for mitigating lateral swing instability (e.g., sway or oscillation) such as may be associated with a vertical axisymmetric bluff body situated at or closely behind the stern of a marine vessel. Exemplary inventive practice uniquely features, inter alia, its implementation of transverse jets so as to cause separation around truncated cylinders and other bluff bodies. An exemplary inventive embodiment represents a unique hydraulic methodology for causing separation around bluff bodies using transverse jets. The term "marine vessel," as used herein, broadly refers to any manmade object, self-propelled or externally propelled, that is designed to travel through water, including but not limited to ships, boats, submersibles, and bodies towed by cables.

In accordance with exemplary practice of the present invention, an inventive apparatus is capable of effecting continually self-stabilizing movement in a fluidic (e.g., air or water) environment. The inventive apparatus includes an approximately cylindrical structure and an inventive device that includes a fluid jet component. The approximately cylindrical structure is characterized by a geometric longitudinal axis, an axial surface, and two axial end surfaces. The axial surface includes two lateral surface areas (regions) on opposite sides of the geometric longitudinal axis. The inventive device is coupled with the cylindrical structure at an axial end. According to exemplary inventive practice, the inventive device and the bluff body are coupled so as to have contiguous respective surfaces, such as exemplified by an adjoining of the two respective substantially flat surfaces of an inventive device (along its top side or bottom side) and a cylindrical bluff body (at its axial end).

According to exemplary inventive practice, the following occurrences are associated with forward movement of the inventive apparatus through a fluidic medium whereby the geometric longitudinal axis is approximately vertical: Dynamic flow of the ambient fluid includes two separate dynamic fluid flows that are respectively generally tangential to the two lateral surface areas and that are each directed generally opposite the forward movement of the approximately cylindrical structure. The fluid jet component intakes ambient fluid and outputs two jet fluid streams respectively flowing adjacent the two lateral surface areas of said axial surface. The two jet fluid streams respectively affect the two dynamic fluid flows so as to at least substantially prevent convergence of the two dynamic fluid flows behind said approximately cylindrical structure. Accordingly, the inventive device at least substantially maintains stability of the approximately cylindrical structure.

BRIEF DESCRIPTION OF THE DRAWINGS

The present invention will now be described, by way of example, with reference to the accompanying drawings, wherein like numbers indicate same or similar parts or components, and wherein:

FIG. 1 is a diagram illustrating an example of a notionally representative marine vessel and a vertical cylindrical bluff-body adjunct fixedly attached astern of the marine vessel.

FIGS. 2 and 3 are diagrams illustrating an example of hydrodynamic side-to-side swaying of the cylindrical adjunct shown in FIG. 1.

FIG. 4 is a diagram illustrating an example of inventive practice with respect to the marine vessel and cylindrical adjunct shown in FIG. 1, wherein an inventive flow-separation apparatus is combined with the cylindrical adjunct, resulting in alleviation or elimination of the hydrodynamic side-to-side swaying shown in FIGS. 2 and 3.

Figure 16:
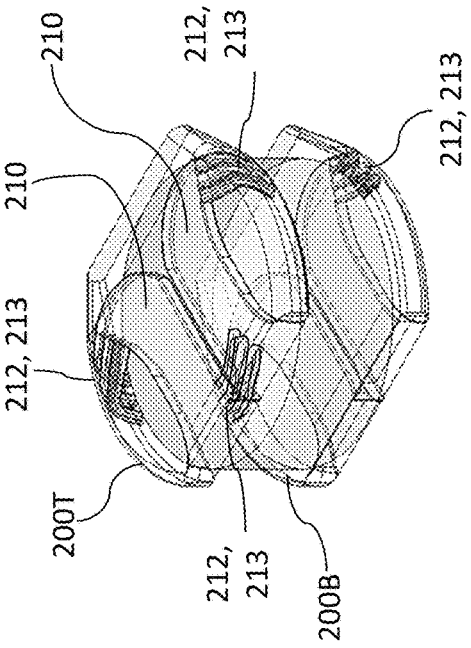
Figure 13:
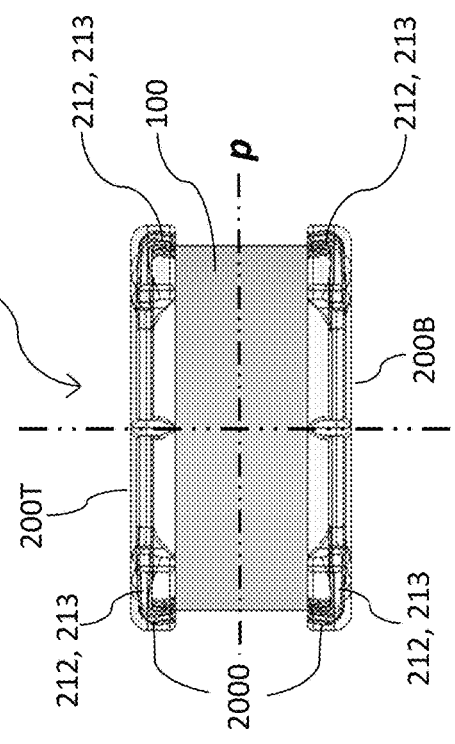
Figure 15:
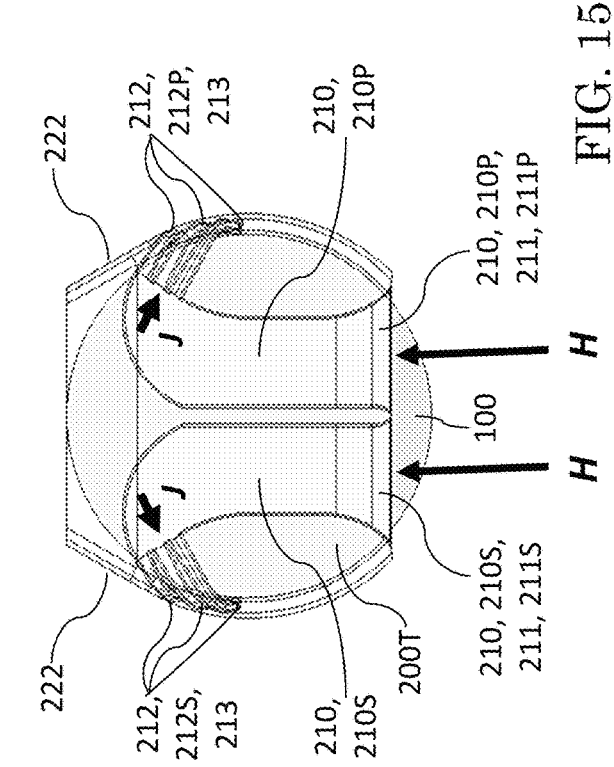

FIGS. 5 through 17 are diagrams illustrating an inventive combination, such as depicted in FIG. 4, of an embodiment of an inventive flow-separation unit with a cylindrical bluff body. The inventive flow-separation unit includes a top inventive flow-separation device and a bottom inventive flow-separation device. FIGS. 5, 6, 12, and 16 are perspective views wherein the top inventive flow-separation device is shown above the cylindrical adjunct. FIGS. 7 and 8 are inverted perspective views wherein the bottom inventive flow-separation device is shown above the cylindrical adjunct. FIGS. 9, 10, 13, 14, and 17 are elevation views. FIGS. 11 and 15 are plan views. FIG. 6 is a transparent version of FIG. 5. FIG. 16 is a transparent version of FIG.

12. FIG. 8 is a transparent version of FIG. 7. FIG. 15 is a transparent version of FIG. 11.

FIG. 18 is a diagram illustrating, by way of example, another inventive combination of an inventive flow-separation unit with a non-cylindrical bluff-body adjunct. The adjunct shown in FIG. 18 is representative of a variety of geometric shapes that are symmetrical with respect to a vertical axis.

FIGS. 19 and 20 are diagrams illustrating, by way of example, an inventive combination of a single inventive flow-separation device and a cylindrical bluff body, wherein a single inventive flow-separation device is situated at one axial end of the cylindrical bluff body.

FIGS. 21 and 22 are diagrams illustrating, by way of example, an inventive combination of at least one inventive flow-separation device and at least two cylindrical bluff bodies, wherein an inventive flow-separation device is interposed between each axially adjacent pair of cylindrical bluff bodies. FIG. 21 shows two cylindrical bluff bodies and at least three inventive flow-separation devices. FIG. 22 shows three cylindrical bluff bodies and at least four inventive flow-separation devices.

DESCRIPTION OF EXEMPLARY EMBODIMENTS OF THE INVENTION

Referring now to FIGS. 1 through 4, a notional marine vessel 1000 includes a main hull 1001 and four foils 1002. Attached to hull 1001 via coupling 450 is a vertical axisymmetric adjunctive bluff body 100. Vessel 1000 is traveling in heading direction D. Cylindrical adjunctive bluff body 100 is characterized by a vertical axis of symmetry a, a diameter d, a height h, a geometric bisector plane p, an axial cylindrical surface 101 and, at the axial ends, two circular end surfaces 102. According to usual inventive practice, the bluff body is characterized by a verticality of an axis of symmetry, and by a curvature or roundedness at its aft end such as rounded aft cylindrical surface portion 105 shown in FIG. 3. Hydrodynamic flow direction H is generally opposite heading direction D, and is generally tangential along portions of said cylindrical surface 101 at generally opposite sides of cylindrical bluff body 100.

As shown in FIGS. 2 and 3, large alternating forces F in athwartship directions tend to be associated with cylinder 100 when moving through water. The two tangential hydrodynamic flows H each tend to hug axial cylindrical surface 101 in its back region, and accordingly tend to converge aft of cylindrical surface 101. Hydrodynamic flow H around cylinder 100 is accordingly asymmetric, particularly laterally, switching back and forth in directional tendencies between port-side and starboard-side. Cylindrical adjunct 100, and hence vehicle 1000 in combination therewith, may be significantly unstable in accordance with this fluidic oscillation or fluctuation. The instability may even be sufficiently severe to cause failure of the vehicle in its intended role or mission.

As shown in FIG. 4, inventive practice implements peripheral waterjets J so as to interact with the tangential hydrodynamic flows H on both sides of adjunctive cylinder 100. Waterjets J, generally perpendicularly impacting the tangential hydrodynamic flows H, cause separation s of each of the two tangential hydrodynamic flows H from its corresponding back region of axial cylindrical surface 101, accordingly resulting in greater separation from each other. Hydrodynamic flow around cylinder 100 improves considerably as a result of these inventively induced flow separations s on both sides of cylinder 100. In particular, inventive practice reduces or eliminates the laterally asymmetric nature of the unsteady flow. Deriving from original hydrodynamic flow H are two waterjet-altered hydrodynamic currents HJ, which are generally parallel to original hydrodynamic flow H and to each other. Flow bubble BB, formed between the two currents HJ, facilitates and maintains the separation s therebetween. Accordingly, while inventive practice may potentially increase drag, a superseding benefit of inventive practice is prevention, to at least a significant degree, of hydrodynamic flow H from causing net forces to the left and right, thereby stabilizing cylindrical adjunct 100 and hence vehicle 1000.

Conventional practice typically involves resort to auxiliary structure in order to mitigate deleterious hydrodynamic effects of a bluff body 100. For instance, in many applications, conventional utilization of such auxiliary structure may degrade sensory performance. Advantageously, inventive practice allows for complete and unadulterated retention of the cylindrical geometry of a bluff body cylinder 100.

Still with reference to FIG. 4 and also with reference to FIGS. 5 through 17, an exemplary embodiment of the present invention's flow separation system 2000 includes two inventive flow separation devices 200, viz., top (upper) flow separation device 200T and bottom (lower) flow separation device 200B. Peripheral waterjet streams J are emitted by inventive flow separation devices 200 generally toward bisector plane p of adjunctive cylinder 100, generally perpendicular to hydrodynamic flow direction H, and generally parallel to axis a of adjunctive cylinder 100.

Flow separation devices 200T and 200B are the main components of flow separation system 2000. Inventive device 200T produces a generally downward jet J; inventive device 200B produces a generally upward jet J. Each flow separation device 200 includes two water jet conduits 210 and is characterized on opposite back sides by two "streamline" tapers 222. Although a back-tapered configuration characterizing inventive device 200 is shown herein by way of example, depending on the inventive embodiment an inventive device 200 may or may not have a tapering character. Particularly as shown in FIGS. 5 through 8, each conduit 210 includes an inlet 211 (for intake of hydrodynamic flow H) and an outlet 212 (for output of waterjet streaming J). Each jet stream outlet 212 includes three adjacent nozzles 213 for pressurized release of waterjets J. Each of the two inlets 211 faces the oncoming hydrodynamic flow H. Each of the two conduits 210 represents a water jet (synonymously, pump-jet or hydrojet) mechanism for converting high static pressure at the front of inventive device 200 into high velocity jets streaming approximately normal to hydrodynamic flow H around bluff body 100. Although each outlet 212 is shown herein by way of example to include three nozzles 213, inventive practice admits of utilization of practically any number of nozzles. According to some inventive embodiments, each (or at least one) inlet is provided with a screen, placed on or over the inlet, to prevent entities such as fish or other marine life from entering the inlet. In the light of the instant disclosure, the ordinarily skilled artisan will appreciate how to utilize one or more water jet mechanisms (e.g., including an axial flow pump and/or a centrifugal flow pump) to efficaciously produce water jet streaming in accordance with the present invention.

In the example shown in FIGS. 5 through 8, inventive devices 200T and 200B are functionally similar but are structurally or configuratively different. For instance, the conduits 210 of upper inventive device 100T significantly differ in shape vis-à-vis the conduits 210 of lower inventive device 1006. Inventive device 200T and inventive device 200B both generally define a horizontal geometric plane and are characterized by symmetry about a longitudinal axis b. However, inventive device 200T has a substantially flat outward surface, whereas inventive device 200B has a central outward bulge. In the light of the instant disclosure, the ordinarily skilled artisan will be capable of designing an inventive device 200, or a similar or dissimilar pair of inventive devices 200, that is/are suitable for a contemplated application.

As shown in FIGS. 5 and 6, upper inventive device 200T has two conduits 210, viz., port-side conduit 210P and starboard-side conduit 210S. Port conduit 210P of upper inventive device 200T includes port flow inlet 211P and port jet outlet 212. Starboard conduit 210S of upper inventive device 200T includes starboard flow inlet 211S and starboard jet outlet 212S. Similarly, as shown in FIGS. 7 and 8, lower inventive device 200B has two conduits 210, viz., port-side conduit 210P and starboard-side conduit 210S. port conduit 210 of lower inventive device 200B includes port inlet 211P, and starboard conduit 210 of lower inventive device 200B includes starboard flow inlet 211S.

Some exemplary inventive embodiments feature a combination of two congruous flow separation devices 200 working in tandem, such as upper flow separation device 200T and lower flow separation device 200B shown in FIGS. 5 through 8 and other figures herein. Inventive devices 200T and 200B together constitute the primary elements of an inventive flow separation unit 2000. It may be considered that an inventive unit 2000, in combination with a vertical axisymmetric bluff body 100, constitutes the primary elements of an inventive flow-separating adjunctive system 3000, which for instance is an integral adjunctive apparatus that is both functionally and hydrodynamically propitious.

Depending on the inventive embodiment, inventive system 3000 need not be "adjunctive." That is, inventive practice is not limited to applications wherein inventive apparatus is added to a previously existing bluff-body structure. Rather, inventive practice is possible wherein an inventive system 3000 is originally made an integral part of an entire seafaring entity. Furthermore, depending on the inventive embodiment, an inventive unit 2000 may be used in combination with a bluff-body structure 100 that itself is either an adjunct to another object or an integral aft portion of a larger whole.

As illustrated in FIG. 11 and other figures, the periphery (perimeter) of each inventive flow separation device 200 is characterized by two curvilinear lateral edges 220, a linear front edge 230, and a linear back edge 240. Each inventive device 200 is characterized, in a horizontal geometric plane generally defined by inventive device 200, by symmetry about the longitudinal axis b of inventive device 200. The curvilinear lateral edges 220 are mirror-image shapes symmetrically disposed on opposite sides of axis b. Located at the front and back ends respectively of inventive device 200 are linear front edge 230 and linear back edge 240, which are each perpendicular to axis b and are parallel to each other. It is to be understood that, according to exemplary inventive practice, either front edge 230 or back edge 240, or both front edge 230 and back edge 240, may be curvilinear instead of linear. Many inventive embodiments in which front edge 230 and/or back edge 240 is/are curvilinear are characterized by parallelism of front edge 230 and back edge 240 with respect to each other, and/or by perpendicularity of front edge 230 and/or back edge 240 with respect to axis b. Depending on the inventive embodiment, the curvature of either front edge 230 or back edge 240 may be characterized by either concavity or convexity with respect to the oncoming hydrodynamic flow H.

Each curvilinear lateral edge 220 includes a curved edge portion 221 and a linear edge portion 222. In furtherance of the hydrodynamics of vessel 100 and inventive system 3000, each curvilinear lateral edge 220 is contoured toward the back. That is, curvilinear later edge 220 includes a substantially linear streamline-tapering edge portion 222, which meets linear back edge 240 at the back end of inventive device 100. The tapers may serve, for instance, to reduce drag; however, depending on the inventive embodiment, the present invention may be practiced in the absence of such tapers. Accordingly, inventive devices 200T and 200B are each divided into two adjoining sections, viz., front section 221 and back section 222. Front device section 221 includes linear front edge 230 and two curved edge portions 221. Back device section 222 includes linear back edge 240 and the two substantially linear streamline-tapering edge portions 222. As illustrated in FIG. 4, the inwardly flared straight-edged shape of back section 222 encourages sustained separation of the two opposite waterjet-altered hydrodynamic currents HJ from each other.

With reference to FIGS. 10, 14, and 17, depending on the inventive embodiment, nozzles 213 and hence waterjets J may be disposed in approximate verticality or at various longitudinal and transverse angles of inclination. According to examples shown herein, waterjets J, emitted from nozzles 213 of outlets 212, are angled toward the side walls of cylindrical body 100 and in forward direction D. FIGS. 10 and 14 show the jets J of water at a forward longitudinal angle $\alpha$, with respect to verticality, of approximately 25°. FIG. 17 shows the jets J of water at an inward transverse angle $\beta$, with respect to verticality, of approximately 10°. Exemplary inventive practice provides for a forward longitudinal angle $\alpha$ that falls within the range between 0° and 50° inclusive, and an inward transverse angle $\beta$ that falls within the range between 0° and 20° inclusive.

Although the bluff bodies 100 shown in FIGS. 1 through 17 are cylindrical (or substantially so), it is to be understood that the present invention can be practiced with respect to bluff axisymmetric bluff bodies of a variety of geometries, including but not limited to cylinder, sphere, ovoid, ellipsoid, oblate spheroid, prolate spheroid, torus, annulus, etc., or some combination thereof that represents a bluff body. FIG. 18 merely depicts an example of the multifarious bluff body 100 shapes, cylindrical and non-cylindrical, that may be suitable for inventive practice.

Most of the examples of inventive practice described herein provide for implementation of two inventive flow separation devices 200, e.g., 200T and 200B, situated at opposite axial ends of a bluff body 100. Now referring to FIGS. 19 and 20, the present invention can be practiced wherein only one inventive device 200 is implemented in association with a bluff body 100. FIG. 19 shows an inventive device 200T coupled with a cylindrical bluff body 100 at the axial top end of bluff body 100. FIG. 20 shows an inventive device 200B coupled with a cylindrical bluff body 100 at the axial bottom end of bluff body 100.

As shown in both FIGS. 19 and 20, waterjets J emanating from the outlets 212 of a single inventive device 200 may be sufficient for effecting separation of hydrodynamic flow in a manner such as depicted in FIG. 4. As compared with inventive implementation of two single inventive devices 200, inventive implementation of a single inventive device 200 will tend to perform more effectively for shorter heights—more specifically, for shorter ratios of height h to diameter d—such as illustrated by way of example via the respective horizontal dashed lines in FIGS. 19 and 20.

With reference to FIGS. 21 and 22, some inventive embodiments provide for an inventive assembly 4000, which includes a coaxial alternating arrangement of plural cylindrical bluff bodies 100, separated from each other by plural inventive devices 200. Each cylindrical bluff body 100 is interposed between two inventive devices 200. FIG. 21 depicts an inventive apparatus including two cylindrical bluff bodies 100. FIG. 22 depicts an inventive apparatus including three cylindrical bluff bodies 100. As shown in FIG. 21, cylindrical bluff bodies 100a and 100b and inventive devices 200Ta, 200Ba, 200Tb and 200Bb are stacked along axis a so that each of two cylindrical bluff bodies 100 is sandwiched between two inventive devices 200. Similarly, as shown in FIG. 22, cylindrical bluff bodies 100a, 100b, and 100c and inventive devices 200Ta, 200Ba, 200Tb, 200Bb, 200Tc, and 200Bc are stacked along axis a so that each of three cylindrical bluff bodies 100 is sandwiched between two inventive devices 200.

An inventive assembly 4000 may be considered to include a plurality of axially adjacent inventive apparatuses 3000. The inventive assembly 4000 shown in FIG. 21 has a first inventive apparatus 3000 (including top inventive device 200Ta, cylindrical bluff body 100a, and bottom inventive device 200Ba) and a second inventive apparatus 3000 (including top inventive device 200Tb, cylindrical bluff body 100b, and bottom inventive device 200Bb). The inventive assembly 4000 shown in FIG. 22 has a first inventive apparatus 3000 (including top inventive device 200Ta, cylindrical bluff body 100a, and bottom inventive device 200Ba), a second inventive apparatus 3000 (including top inventive device 200Tb, cylindrical bluff body 100b, and bottom inventive device 200Bb), and a third inventive apparatus 3000 (including top inventive device 200Tc, cylindrical bluff body 100c, and bottom inventive device 200Bc). An exemplary inventive method to produce an inventive assembly 4000 includes coaxially joining (e.g., fastening, adhering, or welding) plural inventive apparatuses 3000.

FIGS. 21 and 22 illustrate, by way of example, that there are: two inventive devices 200 at the opposite ends (e.g., top and bottom) of inventive assembly 4000; and, intermediate the opposite ends of inventive assembly 4000, at least one coupled pair of inventive devices 200 between each adjacent pair of cylindrical bluff bodies 100. According to some inventive embodiments, each coupled pair of intermediate inventive devices 200 is constructed or constituted as a single or integral unit characterized by a top/upper inventive device 200 (emitting generally downward jets J) and a bottom/lower inventive device 200 (emitting generally upward jets J). Moreover, inventive practice is possible wherein an entire inventive assembly 4000, including two or more coaxial inventive apparatuses 3000, is fabricated in integral fashion.

Two or more bluff bodies 100 may differ in bluff body shape, e.g., at least one bluff body 100 having a cylindrical shape and at least one bluff body 100 having a non-cylindrical shape such as shown by way of example in FIGS. 18 through 20. Practically any quantity of bluff bodies 100 and inventive devices 200 is possible in inventive practice. Depending on the inventive embodiment, the dimensions and/or material compositions of plural bluff bodies 100 may be the same or different. For instance, the diameters and/or the axial lengths of plural cylindrical bluff bodies 100 may be equal or unequal.

According to some inventive embodiments, the number of inventive devices 200 exceeds by at least one the number of cylindrical bluff bodies 100. Two inventive devices are respectively located at opposite axial ends of inventive assembly 4000. Between the axial ends of inventive assembly 400, at least one inventive device 200 is interposed between every axially adjacent pair of cylindrical bluff bodies 100. As exemplarily embodied, an at least one inventive device 200 serves to separately effectuate jet streaming J with respect to the cylindrical bluff bodies 100 between which the at late one inventive device is interposed. An at least one inventive device 200 may constitute, for instance, two adjoining inventive devices 200 or one integral inventive device 200. According to some inventive embodiments, the number of inventive devices 200 equals the number of cylindrical bluff bodies 100, wherein an inventive device 100 is present at one axial end of inventive assembly 4000 but is not present at the other axial end of inventive assembly 4000.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An apparatus for effecting self-stabilizing movement in a fluidic environment, the apparatus comprising:
   an approximately cylindrical structure characterized by a geometric longitudinal axis, an axial surface, and two axial ends, said axial surface having two lateral surface areas on opposite sides of said geometric longitudinal axis;
   a device coupled with said cylindrical structure at a said axial end, said device including a fluid jet component;
   wherein, in association with forward movement of the apparatus through a fluidic medium whereby said geometric longitudinal axis is approximately vertical:
   dynamic flow of said ambient fluid includes two separate dynamic fluid flows that are respectively generally tangential to said two lateral surface areas and that are each directed generally opposite said forward movement of said approximately cylindrical structure;
   said fluid jet component intakes ambient fluid and outputs two jet fluid streams respectively flowing adjacent said two lateral surface areas of said axial surface;
   said two jet fluid streams respectively affect said two dynamic fluid flows so as to at least substantially prevent convergence of said two dynamic fluid flows behind said approximately cylindrical structure.

2. The apparatus of claim 1 wherein:
   for some distance behind said approximately cylindrical structure, said two dynamic fluid flows each continue to be directed generally opposite said forward movement of said approximately cylindrical structure;
   said device at least substantially maintains stability of said approximately cylindrical structure.

3. The apparatus of claim 1 wherein:
   said approximately cylindrical structure is characterized by a circumference;

said device is characterized by a truncated approximately circular front section and an approximately trapezoidal back section;

said approximately circular front section is characterized by a coaxiality with, and a diametrically greater approximate circularity than, said approximately cylindrical structure;

an approximately circular peripheral portion of said truncated approximately circular front section extends beyond said circumference of said approximately cylindrical structure;

said approximately trapezoidal back section narrows toward the back end of said device;

said fluid jet component releases said two jet fluid streams in a generally axial direction from respective locations in said truncated approximately circular peripheral portion of said device.

4. The apparatus of claim 1 wherein:

said device is a first said device;

said first device is coupled with said cylindrical structure at a first said axial end;

the self-stabilizing apparatus further comprises a second said device;

said second device is coupled with said cylindrical structure at a second said axial end.

5. The apparatus of claim 1, wherein:

the apparatus comprises at least two said cylindrical structures and at least one said device;

said at least two cylindrical structures and said at least one device is characterized by a coaxial assembly of said at least two cylindrical structures and said at least one device;

at least one said device is interposed between each axially adjacent pair of said two cylindrical structures.

6. The apparatus of claim 1, wherein:

the apparatus comprises at least two said cylindrical structures and at least two said devices;

said at least two cylindrical structures and said at least two devices are characterized by a coaxial assembly of said at least two cylindrical structures and said at least two devices and are further characterized by two coaxial assembly ends of said coaxial assembly;

at least one said device is interposed between each axially adjacent pair of said two cylindrical structures;

at least one said device is coupled with a said cylindrical structure at a said coaxial assembly end.

7. The apparatus of claim 1, wherein:

the apparatus comprises at least two said cylindrical structures and at least three said devices;

said at least two cylindrical structures and said at least three devices are characterized by a coaxial assembly of said at least two cylindrical structures and said at least three devices and are further characterized by two coaxial assembly ends of said coaxial assembly;

at least one said device is interposed between each axially adjacent pair of said two cylindrical structures;

at least a first said device is coupled with a said cylindrical structure at a first said coaxial assembly end;

at least a second said device is coupled with a said cylindrical structure at a second said coaxial assembly end.

8. A method for stabilizing an approximately cylindrical vehicular structure characterized by a geometric longitudinal axis, an axial surface, and two axial ends, said axial surface having two lateral surface areas on opposite sides of said geometric longitudinal axis, the method comprising:

coupling a device with said approximately cylindrical vehicular structure at a said axial end, said device including a fluid jet component;

causing said approximately cylindrical vehicular structure, having said device coupled therewith, to move forward through a fluidic medium whereby said cylindrical axis is approximately vertical;

wherein, in association with forward movement of said approximately cylindrical vehicular structure through a fluidic medium whereby said geometric longitudinal axis is approximately vertical:

dynamic flow of said ambient fluid includes two separate dynamic fluid flows that are respectively generally tangential to said two lateral surface areas and that are each directed generally opposite said forward movement of said approximately cylindrical vehicular structure;

said fluid jet component intakes ambient fluid and outputs two jet fluid streams respectively flowing adjacent said two lateral surface areas of said axial surface;

said two jet fluid streams respectively affect said two dynamic fluid flows so as to at least substantially prevent convergence of said two dynamic fluid flows behind said approximately cylindrical vehicular structure.

9. The method for stabilizing of claim 8 wherein:

for some distance behind said approximately cylindrical vehicular structure, said two dynamic fluid flows each continue to be directed generally opposite said forward movement of said approximately cylindrical vehicular structure;

said device at least substantially maintains stability of said approximately cylindrical vehicular structure.

10. The method for stabilizing of claim 8 wherein:

said approximately cylindrical vehicular structure is characterized by a circumference;

said device is characterized by a truncated approximately circular front section and an approximately trapezoidal back section;

said approximately circular front section is characterized by a coaxiality with, and a diametrically greater approximate circularity than, said approximately cylindrical vehicular structure;

an approximately circular peripheral portion of said truncated approximately circular front section extends beyond said circumference of said approximately cylindrical vehicular structure;

said approximately trapezoidal back section narrows toward the back end of said device;

said fluid jet component releases said two jet fluid streams in a generally axial direction from respective locations in said truncated approximately circular peripheral portion of said device.

11. The method for stabilizing of claim 8 wherein:

said device is a first said device;

said first device is coupled with said approximately cylindrical vehicular structure at a first said axial end;

the method further comprises coupling a second said device with said approximately cylindrical vehicular structure at a second said axial end.

12. Hydrodynamic apparatus for use in association with an axisymmetric bluff body characterized by an approximately vertical geometric axis, two axial ends, and an exterior axial surface, the hydrodynamic apparatus comprising a device characterized by a substantially linear front edge, two curvilinear side edges, an approximately horizontal longitudinal geometric axis approximately perpendicular to said substantially linear front edge, and substantial axial symmetry with respect to said approximately horizontal longitudinal geometric axis, said device including a conduit for intake of hydrodynamic flow at said substantially linear front edge and for output of jet streaming at each said curvilinear side edge, said device being attachable to said axisymmetric bluff body at a said axial end so that said approximately horizontal longitudinal geometric axis and said approximately vertical geometric axis approximately perpendicularly intersect, wherein interaction of said jet streaming with at least some said hydrodynamic flow that is tangential to said exterior axial surface of a moving said axisymmetric body results in separation of at least some said tangential hydrodynamic flow from said exterior axial surface.

13. The hydrodynamic apparatus of claim 12 wherein, during said interaction, said jet streaming is directed generally along said exterior axial surface of said bluff body and approximately perpendicular to said hydrodynamic flow.

14. The hydrodynamic apparatus of claim 13 wherein:
said device is a first said device;
the hydrodynamic apparatus further comprises a second said device;
the first said device is attachable to said axisymmetric bluff body at a first said axial end;
the second said device is attachable to said axisymmetric bluff body at a second said axial end;
during said interaction, said jet streaming from the first said device is directed generally toward the second said device, and said jet streaming from the second said device is directed generally toward the first said device.

15. The hydrodynamic apparatus of claim 12 wherein:
each said curvilinear side edge includes a curved front side edge portion and a substantially linear back side edge portion that is tapered aftward toward said substantially horizontal longitudinal geometric axis;
said conduit is for output of said jet streaming at each said curved front side edge portion;
said substantially linear back side edge portions act to streamline at least some said tangential hydrodynamic flow with which said jet streaming interacts.

16. The hydrodynamic apparatus of claim 15 wherein:
said device is further characterized by a front section, a back section, and a substantially linear back edge;
said approximately horizontal longitudinal geometric axis is approximately perpendicular to said substantially linear back edge;
said front section of said device is delimited by said substantially linear front edge and each said curved front side edge portion;
said back section of said device is delimited by said substantially linear back edge and each said substantially linear back side edge portion.

17. The hydrodynamic apparatus of claim 16 wherein said curved section of said device substantially conforms with the shape of said axisymmetric bluff body to which said device is attached.

18. The hydrodynamic apparatus of claim 12 wherein said axisymmetric bluff body is a substantially cylindrical bluff body, said two axial ends are substantially circular axial ends, and said exterior axial surface is a substantially cylindrical axial surface.

19. The hydrodynamic apparatus of claim 18 wherein, during said interaction, said jet streaming is directed generally along said exterior axial surface of said bluff body and approximately perpendicular to said hydrodynamic flow.

20. The hydrodynamic apparatus of claim 19 wherein:
said device is a first said device;
the hydrodynamic apparatus further comprises a second said device;
the first said device is attachable to said substantially cylindrical bluff body at a first said axial end;
the second said device is attachable to said substantially cylindrical bluff body at a second said axial end;
during said interaction, said jet streaming from the first said device is directed generally toward the second said device, and said jet streaming from the second said device is directed generally toward the first said device.

21. The hydrodynamic apparatus of claim 18 wherein:
each said curvilinear side edge includes a curved front side edge portion and a substantially linear back side edge portion that is tapered aftward toward said substantially horizontal longitudinal geometric axis;
said conduit is for output of said jet streaming at each said curved front side edge portion;
said substantially linear back side edge portions act to streamline at least some said tangential hydrodynamic flow with which said jet streaming interacts.

22. The hydrodynamic apparatus of claim 21 wherein:
said device is further characterized by a front section, a back section, and a substantially linear back edge;
said approximately horizontal longitudinal geometric axis is approximately perpendicular to said substantially linear back edge;
said front section of said device is delimited by said substantially linear front edge and each said curved front side edge portion;
said back section of said device is delimited by said substantially linear back edge and each said substantially linear back side edge portion.

23. The hydrodynamic apparatus of claim 22 wherein said curved section of said device substantially conforms with the substantially cylindrical shape of said axisymmetric bluff body to which said device is attached.

* * * * *